US012413109B2

(12) United States Patent
Van Rietschoten

(10) Patent No.: US 12,413,109 B2
(45) Date of Patent: Sep. 9, 2025

(54) APPARATUS

(71) Applicant: Ecomo Company Limited, Ramsey (IM)

(72) Inventor: Jan Jacob Van Rietschoten, Eastbourne (GB)

(*) Notice: Subject to any disclaimer, the term of this patent is extended or adjusted under 35 U.S.C. 154(b) by 624 days.

(21) Appl. No.: 17/724,180

(22) Filed: Apr. 19, 2022

(65) Prior Publication Data

US 2022/0344988 A1 Oct. 27, 2022

(30) Foreign Application Priority Data

Apr. 22, 2021 (GB) .................................... 2105766

(51) Int. Cl.
*H02K 1/27* (2022.01)
*H02K 1/17* (2006.01)
*H02K 1/278* (2022.01)
*H02K 7/00* (2006.01)
*H02K 7/116* (2006.01)
*H02K 11/01* (2016.01)

(52) U.S. Cl.
CPC .............. *H02K 1/278* (2013.01); *H02K 1/17* (2013.01); *H02K 7/003* (2013.01); *H02K 7/116* (2013.01); *H02K 11/012* (2020.08)

(58) Field of Classification Search
CPC ........ H02K 1/278; H02K 11/012; H02K 1/17; H02K 7/003; H02K 7/116
See application file for complete search history.

(56) References Cited

U.S. PATENT DOCUMENTS

2009/0243414 A1  10/2009  Lamas

FOREIGN PATENT DOCUMENTS

| CN | 1753297 | 3/2006 |
|---|---|---|
| CN | 102510241 | 6/2012 |
| GB | 2298319 | 8/1996 |
| KR | 10-2008-0013762 | 2/2008 |
| KR | 20080013762 | 2/2008 |

OTHER PUBLICATIONS

Davidson "Examination Opinion for Application No. GB2105766.6" mailed on Oct. 5, 2021, 3 pages.

(Continued)

*Primary Examiner* — Terrance L Kenerly
(74) *Attorney, Agent, or Firm* — Intellectual Strategies

(57) ABSTRACT

A magnetic motor apparatus includes a motor housing, rotor element, rotatable urging elements and locking mechanism. The rotor element has an inner and outer rotor element, both including a plurality of permanent arc magnets arranged concentrically. The inner and outer rotor element are rotatable around an axis of rotation. The rotor element includes a plurality of shielding elements arranged in a third circle concentrically around the outer rotor element. An output shaft, rotatable with the rotor element, extends along the central axis of rotation and partly out the housing. The urging elements are arranged in a fourth circle concentrically around the rotor element. Each rotatable urging element includes a permanent magnet having poles, and is rotatable around a peripheral axis, such that each pole of the rotatable urging element in-use alternatingly faces the rotor element to impart an urging force. The locking mechanism controls rotation of the urging elements.

19 Claims, 12 Drawing Sheets

(56) References Cited

OTHER PUBLICATIONS

Davidson "Examination Report under Section 18(3) for Application No. GB2105766.6" mailed on Mar. 24, 2022, 1 page.
Davidson "Search Report under Section 17 for Application No. GB2105766.6" mailed on Feb. 17, 2022, 1 page.
Thorsten "European Search Report for Application No. EP22159404" mailed on Sep. 6, 2022, 7 pages.
FRAPPORTI "European Patent Office Examination Report for Application No. 22159404.7" mailed on Apr. 15, 2025, 4 pages.

10 →

10 →

10 →

APPARATUS

FIELD OF THE INVENTION

The present invention relates to an experimental magnetic motor apparatus for providing an output which may be electrical and/or mechanical, the motor apparatus having a greater efficiency.

BACKGROUND OF THE INVENTION

A motor is an essential component of many electrical goods, including automotive transport means, domestic appliances, tools, and electronic devices. A motor typically includes a stator and a rotor which is rotatable relative to the stator. One of the rotor and the stator usually includes an electromagnet whilst the other comprises permanent magnets. Electricity is used to energise the electromagnet. An energised electromagnet has a north magnetic pole and a south magnetic pole. The magnetic poles of the electromagnet are attracted to an opposite magnetic pole of a permanent magnet, such that the rotor is put into motion. The polarity of the electromagnet is periodically reversed in order to prevent alignment of opposite poles, thereby maintaining the rotary motion. This may be achieved via a commutator. The rotary motion of the rotor is transformed into an output via an output means. An output shaft is an example of an output means which provides a mechanical output via a shaft.

Continuously supplying electrical energy for the motor to function results in a reduced efficiency of the motor. A continuous electrical energy supply also increases the risk of electrocution. Harmonics of an electric current are undesirable side effects, which constitute further energy losses, particularly in the form of heat, thereby reducing the efficiency of the motor further.

SUMMARY OF THE INVENTION

The present invention seeks to provide a solution to these problems.

According to a first aspect of the present invention, there is provided an experimental magnetic motor apparatus comprising: a motor housing; a rotor element within the motor housing, the rotor element having an inner rotor element including a plurality of permanent arc magnets arranged in a first circle, an outer rotor element including a plurality of permanent arc magnets arranged in a second circle concentrically disposed around the inner rotor element, the inner rotor element and the outer rotor element being rotatable around a common central axis of rotation, and a plurality of shielding elements arranged in a third circle concentrically around the outer rotor element; an output shaft extending along or substantially along the central axis of rotation and at least partly out of the housing, the output shaft being rotatable with the rotor element; a plurality of rotatable urging elements arranged in a fourth circle concentrically around the rotor element and the plurality of shielding elements, each rotatable urging element including a permanent magnet having poles, and being rotatable around a peripheral axis of rotation such that, upon rotation of each rotatable urging element, each said pole of the rotatable urging element in-use alternatingly faces the rotor element to impart an urging force thereon; and a locking mechanism for controlling the rotation of the plurality of rotatable urging elements.

The motor apparatus is a new kind of motor suitable for powering automotive transport, generating domestic electricity or miniaturisation. It does not produce any emissions or produces lower emissions. The alternating polarity of the urging elements produces a force to keep the rotor turning. Energy losses are minimised by maintaining at least some of the rotational momentum of the rotor element due to the urging elements. Minimising energy losses increases the efficiency of the motor apparatus.

In other words, the advantage is that the motor apparatus comprises several, optionally smaller, magnets, the urging elements, which flip their polarity using the force that is produced by the rotor. Permanent magnets either attract or repel each other, without requiring electricity. This property of magnets is used to push a rotor from behind and to pull it from ahead producing the force to keep itself going and to provide an output.

Preferably, the permanent magnet of at least one said rotatable urging element may be cylindrical. Cylindrical urging elements may be packed more tightly and/or the distance from the surface of the rotatable urging element to the rotor element is or is substantially constant.

Alternatively, the permanent magnet of at least one said rotatable urging element may be a prism. In other words, the permanent magnet may have a square or rectangular lateral and/or longitudinal cross-section.

Beneficially, the locking mechanism may comprise a rotation-imparting element for imparting a rotational force to a rotatable urging element, and a blocking element for selectively preventing or inhibiting rotation of a rotatable urging element. The rotation-imparting element causes the urging element to rotate to present a different face to the rotor element. The blocking element limits or constrains the rotation of the urging element to occur only when it is beneficial to do so. Thus, the urging element is not freely rotatable.

Advantageously, the rotation-imparting element may include a wheel associated with each rotatable urging element. Furthermore, the wheel may have peripheral teeth. The wheel acts as a gear or cog in-use. A wheel, and more preferably a cogged wheel, may be available off the shelf, thus manufacture may be facilitated.

Additionally, the rotation-imparting element may further comprise an array of teeth associated with the rotor element and arranged to be temporarily engageable with the wheel for rotating the associated rotatable urging element. The array of teeth improves the engagement with the, preferably toothed, wheel.

Beneficially, the blocking element may include a movable part arranged to be movable between an engaged condition with a said rotatable urging element in which rotation of the urging element is prevented or inhibited, and a disengaged condition in which rotation of the urging element is permitted. Optionally, the movable part may comprise an arm. Furthermore, the arm may be pivotable. The arm may alternatively be translatable. Additionally, the movable part may have a lateral cross-sectional shape which may be one of: a trapezium, a trapezoid, and a triangle. By being selectively engageable with the urging element, the movable part permits or prevents rotation of the urging element.

Advantageously, the blocking element may further comprise a biasing means arranged to maintain the movable part in the engaged condition or bias the movable part into or towards the engaged condition if the movable part is in the disengaged condition. Beneficially, the biasing means may comprise a spring. The advantage of the biasing means or mechanism is that an urging element is in the engaged position by default.

Preferably, the blocking element may include a disengagement element for moving the movable part from the engaged condition to the disengaged condition. Beneficially, the disengagement element may include a fixed cantilevered arm extending from the rotor element and arranged to be temporarily engageable with the movable part to exert a force thereagainst. A fixed cantilevered arm reduces the number of moving parts. Fewer moving parts means that manufacture and assembly are facilitated. The cantilevered arm being fixed relative to the rotor element also means that the cantilevered arm rotates together with the rotor element.

Optionally, the disengagement element may have a lateral cross-sectional shape which is one of: a trapezium, a trapezoid, and a triangle. If one or both of the disengagement element and movable part has a cross-section which is a trapezium, a trapezoid or a triangle, the geometry facilitates engagement of the disengagement element with the movable part so that the disengagement element may move the movable part towards the disengaged condition.

Furthermore, the blocking element may include an anti-rotation element and a stop element engageable with the anti-rotation element for preventing or inhibiting rotation of an urging element. Optionally, the stop element may include a groove. Additionally or alternatively, the anti-rotation element may comprise an elongate element receivable within the groove. These features may act as a secondary lock, if interference fit or friction between the movable part and the urging element is the primary means of preventing or inhibiting rotation of the urging element. The anti-rotation element and stop element may be the primary and/or only means of preventing or inhibiting rotation of an urging element, for example, if there is no interference fit or friction between the movable part and the urging element.

Advantageously, the experimental magnetic motor apparatus may further comprise an electromagnet for generating a magnetic field to provide an electromagnetic force to drive the rotor element or for extracting energy from the motor apparatus. The electromagnet can provide an output in the force of electricity in addition or instead of the output shaft. The apparatus may optionally be considered to act as a battery. The electromagnet may also be used to induce rotation of the rotor element.

Furthermore, the electromagnet may be arranged radially outwardly of the inner rotor element. Additionally, the electromagnet may be arranged radially inwardly of the outer rotor element. The electromagnet is positioned between the inner and outer rotor elements. This relative position may be advantageous because both inner and outer rotor elements may experience the same or substantially the same strength of the magnetic field generated by the electromagnet. In contrast, if the electromagnet were positioned radially inwardly of the inner rotor element or outwardly of the outer rotor element, one of the rotor elements would experience a weaker magnetic field than that experienced by the other rotor element. Either alternative position may be envisioned.

Optionally, the experimental magnetic motor apparatus may further comprise a plurality of rotatable outer urging elements arranged in a fifth circle concentrically around the rotor element, the plurality of shielding elements and the plurality of rotatable urging elements arranged in a fourth circle, each outer rotatable urging element including a permanent magnet having poles, and being rotatable around a peripheral axis. An increased number of urging element increases the magnetic forces and thereby, the urging force imparted onto the rotor element.

According to a second aspect of the invention, there is provided an experimental magnetic motor apparatus comprising: a motor housing; a rotor element positionable within the motor housing, the rotor element having: a plurality of permanent magnets arranged or arrangeable to form a first circle or a first polygon, and a plurality of shielding elements arranged or arrangeable in or substantially in a second circle or a second polygon concentrically around the said plurality of permanent magnets, the rotor element or part thereof being rotatable around a central axis of rotation; an output means; a plurality of rotatable urging elements arranged in a third circle or a third polygon concentrically around the rotor element and the plurality of shielding elements, each rotatable urging element including a further permanent magnet having poles, and being rotatable around a peripheral axis of rotation such that, upon rotation of each rotatable urging element, each said pole of the rotatable urging element in-use alternatingly faces the rotor element to impart an urging force thereon; and a locking mechanism for controlling the rotation of the plurality of rotatable urging elements.

The motor apparatus provides an output, which may be mechanical and/or electrical. The urging means may reduce energy losses by maintaining the rotational momentum of the rotor element. The motor apparatus is simpler as it does not require an inner rotor element and an outer rotor element, although these could be envisioned.

BRIEF DESCRIPTION OF THE DRAWINGS

The invention will now be more particularly described, by way of example only, with reference to the accompanying drawings, in which.

DETAILED DESCRIPTION

Figure 1:
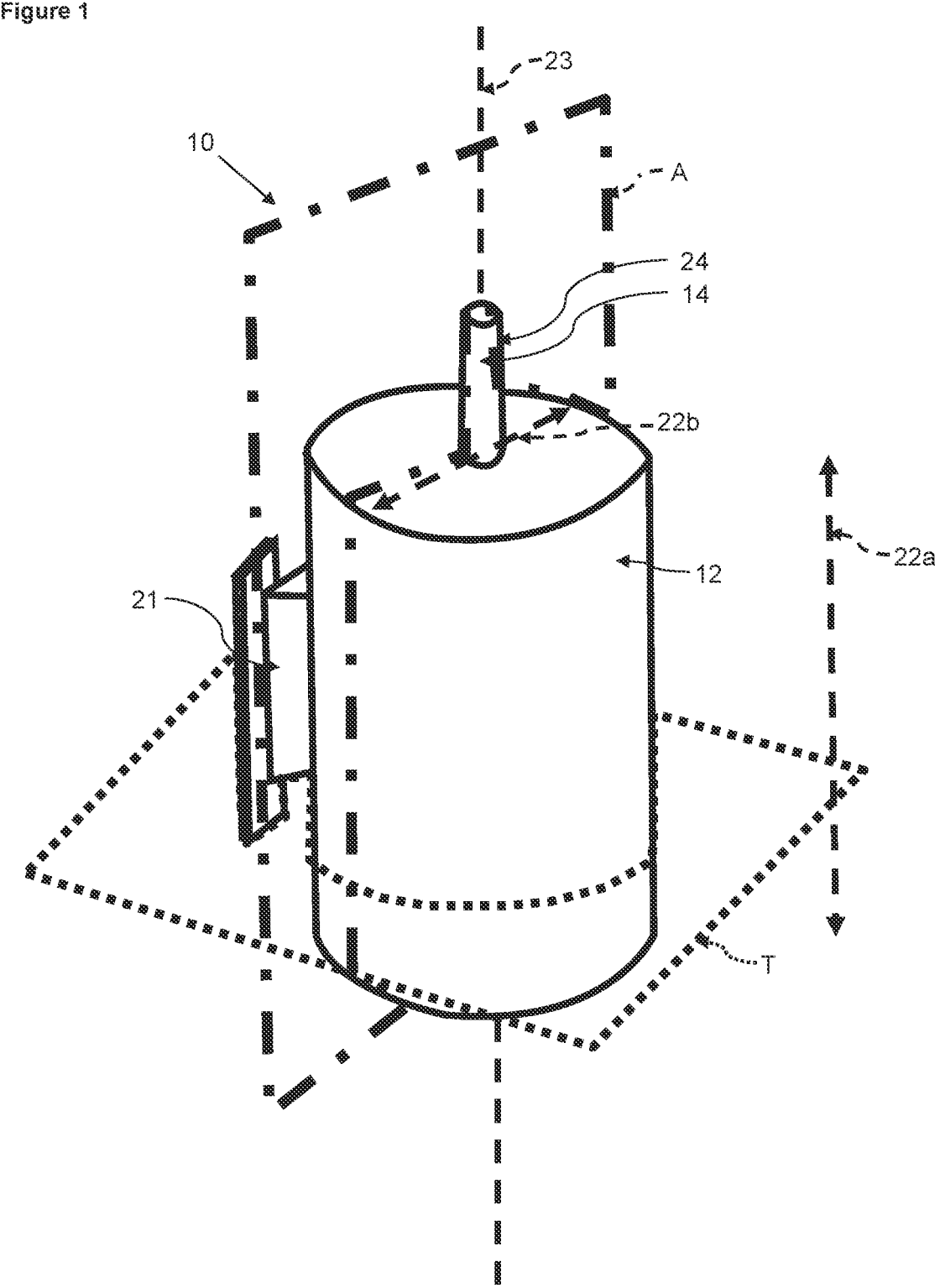
FIG. 1 shows a perspective representation of a first embodiment of an experimental magnetic motor apparatus, in accordance with the second aspect of the invention.

Referring firstly to FIG. 1, there is shown an apparatus indicated generally at 10. The apparatus 10 may be referred to as a motor apparatus or a magnetic motor apparatus or an assembly. The motor apparatus 10 may be experimental or non-experimental. The magnetic motor apparatus 10 uses magnetic elements to provide an output. The motor apparatus 10 comprises a motor housing 12, output means 14, a rotor or rotor element 16, at least one urging element or portion 18, and a locking mechanism 20, although any of the above features may be omitted and/or a plurality of any of the above may be provided. Any part of the apparatus 10 may be formed of plastics, metal, wood, magnetic material, ferrous material, any other suitable material, or any combination thereof.

Figure 2:
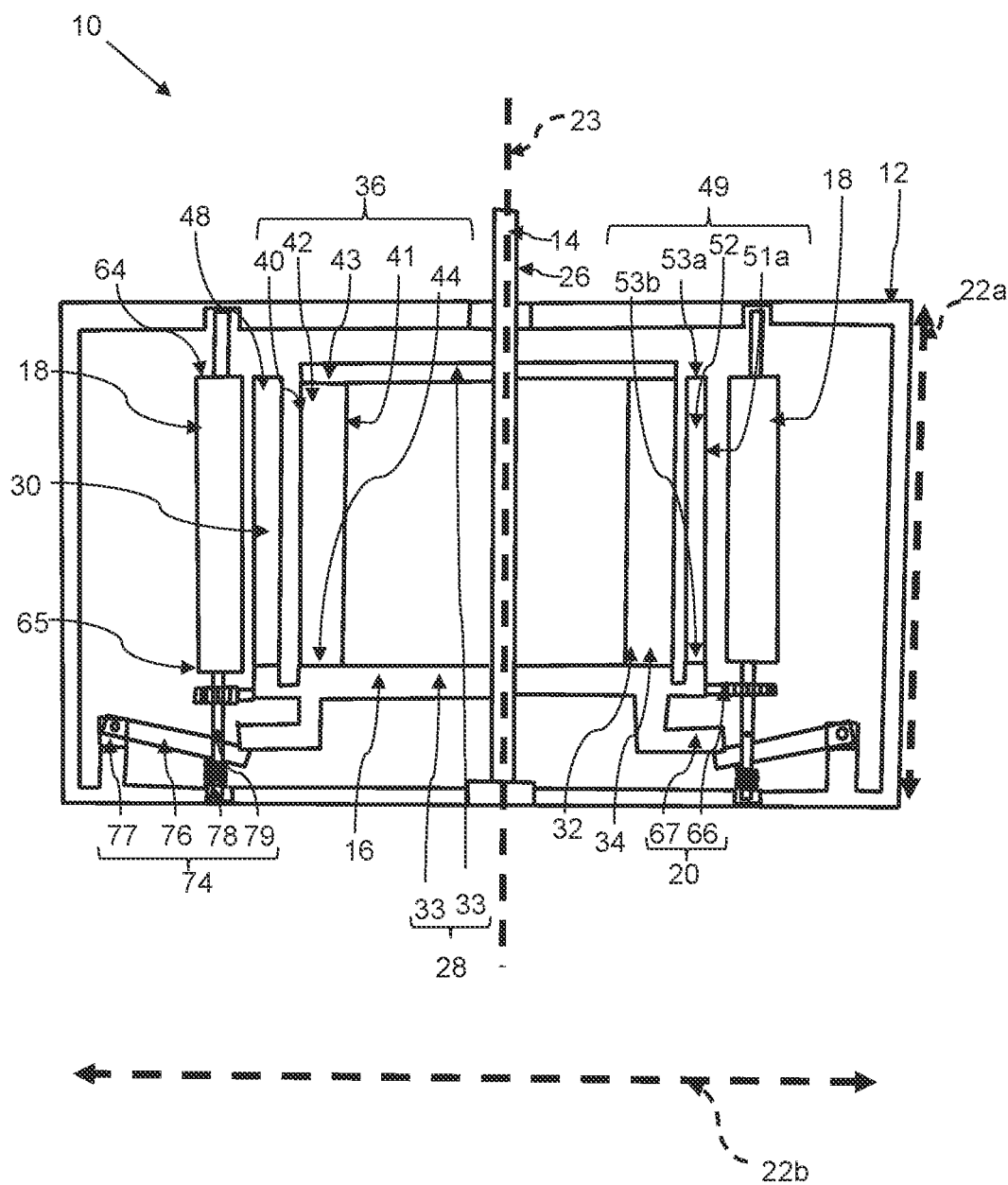
FIG. 2 illustrates an axial cross-sectional representation of the motor apparatus of FIG. 1.

The motor housing 12 and part of the output means 14 are shown in FIG. 1. An axial plane A is indicated in dot-dashed lines, whilst a transverse plane T is shown in dotted lines in FIG. 1. FIG. 2 is a cross-section of FIG. 1, taken along the axial plane A. FIG. 2 shows the rotor element 16, two urging elements 18, and the locking mechanism 20 in addition to the motor housing 12 and the output means 14. The at least one urging element 18, also referred to as a segment or urger, and at least part of the locking mechanism 20 may optionally be referred to as a stator. Thus, the basic configuration preferably comprises a rotor 16, a stator and a casing 12.

The motor housing or casing 12 houses, surrounds, supports and/or protects all or at least some parts of the motor apparatus 10. Preferably, the casing 12 is at least partly radially and/or at least partly axially outwardly of at least one of, and preferably all of: the output means 14, the rotor or rotor element 16, the at least one urging element 18, and the locking mechanism 20. The motor housing 12 is shown in FIGS. 1 and 2 as or substantially as being cylindrical but any non-cylindrical shape may be envisioned, such as rectangular or square. The motor housing 12 preferably has a cylindrical wall, a top wall and a bottom wall, but any wall may be omitted. The walls are preferably continuous, but discontinuous is an option, such as for improved cooling. In other words, at least one wall may have an aperture therethrough. Alternatively or additionally, at least one wall may be formed of a plurality of wall sub-portions. The sub-portions may be integrally formed with each other, or non integrally formed. The sub-portions may be connected or connectable with each other. Optionally the motor housing 12 enables engagement, connection or securing of the motor apparatus 10 to, in, on, or against a supporting element or support, such as a wall, a floor, a further casing, or a vehicle. In the shown embodiment, this is provided by at least one extension element or extension 21, but this feature may be omitted. The extension element 21 may extend from any wall or side of the motor housing 12. The motor housing 12 may be provided in any orientation. The motor housing 12 has a longitudinal dimension or extent 22a, a lateral dimension or extent 22b, both indicated by double-headed dashed arrows in FIGS. 1 and 2, and a housing-axis 23 indicated as a dashed line in FIGS. 1 and 2. In the preferred embodiment, the longitudinal dimension 22a may also be referred to as an axial extent. Similarly, the lateral dimension 22b may be referred to as a diameter.

For clarity, the terms "longitudinal" and "lateral" will be maintained, even in cases where the longitudinal extent may be less than the lateral extent.

Any plane containing or extending parallel with the housing-axis 23 may be referred to as an axial plane or longitudinal plane, such as plane A. Similarly, any plane extending, preferably perpendicularly, through the housing-axis 23 may be referred to as a transverse plane or lateral plane, such as plane T.

The output means, portion, part or element 14 provides the output of the motor apparatus 10. The output means 14 is preferably a mechanical output means 14 but a non-mechanical output means may be envisioned in addition or instead. In the preferred embodiment, the output means 14 comprises an output shaft 24. In FIG. 1, the output shaft 24 extends along all or along an at least major portion of the longitudinal extent 22a of the motor housing 12. A minor portion of the longitudinal extent may be an option, however. As shown, the output shaft 24 also extends at least partly out of the housing 12, but this is optional. The output shaft 24 is rotatable with the rotor element 16. The output shaft 24 may be hollow, non-hollow or part hollow. The output shaft 24 may be formed of plastics, metal, wood, or any other suitable material.

The rotor element 16 is positioned or positionable within the motor housing 12. The rotor element 16 may be referred to simply as a rotor, for clarity. The rotor element 16 is in-use rotatable relative to the motor housing 12. The rotor element 16 in the preferred embodiment is connected, connectable or integrally formed with the output means 14, and more preferably, with the output shaft 24. This enables the output shaft 24 to be rotatable with the rotor element 16. The rotor element 16 comprises a rotor-axis 26, a rotor-support 28, at least one shielding element or shield 30, and a first rotor element or part 32, although any of the features may be omitted and/or a plurality of any of the above may be provided.

The rotor-axis 26 is a central axis of rotation around which the rotor element 16 or part thereof is rotatable. The rotor element 16 may comprise an axle instead of or in addition to the output shaft 24 but the axle is preferably omitted. Preferably, the output shaft 24 is adjacent, at, around, or on the central axis of rotation 26 but this is optional.

The rotor-support 28 connects or supports the shielding element 30 and/or the first rotor element 32 or parts thereof. Additionally the rotor-support 28 may optionally enable connection or engagement of the first rotor element 32 and/or the at least one shielding element 30 with the output means 14, whether direct or indirect. In the preferred embodiment, the rotor-support 28 causes the output shaft 24 to rotate together with the first rotor element 32 and/or the at least one shielding element 30. The rotor-support 28 comprises at least one, and more preferably two platform elements or platforms 33 as shown in FIG. 2.

The at least one first rotor element 32 comprises at least one, and more preferably a plurality of magnets 34, referred to as rotor magnets 34 for clarity. Here, the plurality of rotor magnets 34 comprises six magnets but any alternative, preferably even, number of magnets may be envisioned. An odd number of magnets may be an option, however. The rotor magnets 34 are preferably permanent magnets, but non-permanent magnets, such as electromagnets, may be envisioned.

Each rotor magnet 34 may be referred to as a mover. Each rotor magnet 34 of the first rotor element 32 has a rotor magnet body 36. The rotor magnet body 36 has two rotor magnetic poles 38, a rotor outward-facing surface 40, a rotor inward-facing surface 41, two rotor side-contact surfaces 42, a rotor top surface 43 and a rotor bottom surface 44.

The bottom surface 44 of each rotor magnet 34 is connected or connectable with the or one of the platform elements 33. The top surface 43 is optionally connected or connectable with the or one of the platform elements 33. The outward-facing surface 40 and the inward-facing surface 41 are polarised, in other words, they are or contain at least part of one of the magnetic poles 38 of the rotor magnet 34. Thus, the outward-facing surface 40 and the inward-facing surface 41 may be referred to as the outward-facing polar surface 40 and the inward-facing polar surface 41, respectively. At least one, and preferably all the rotor magnets 34 are arcuate or arc magnets, but non-arcuate or part arcuate magnets are possible. The plurality of rotor magnets 34 are arranged or arrangeable to be radially outwardly of the rotor-axis 26. The plurality of rotor magnets 34 are abuttable, abutted, or connected to each other, preferably by their side-contact surfaces 42, although a gap may be provided between side-contact surfaces. The meeting or close-abutment of two side-contact surfaces 42 may be referred to as a junction 45.

Figure 3:
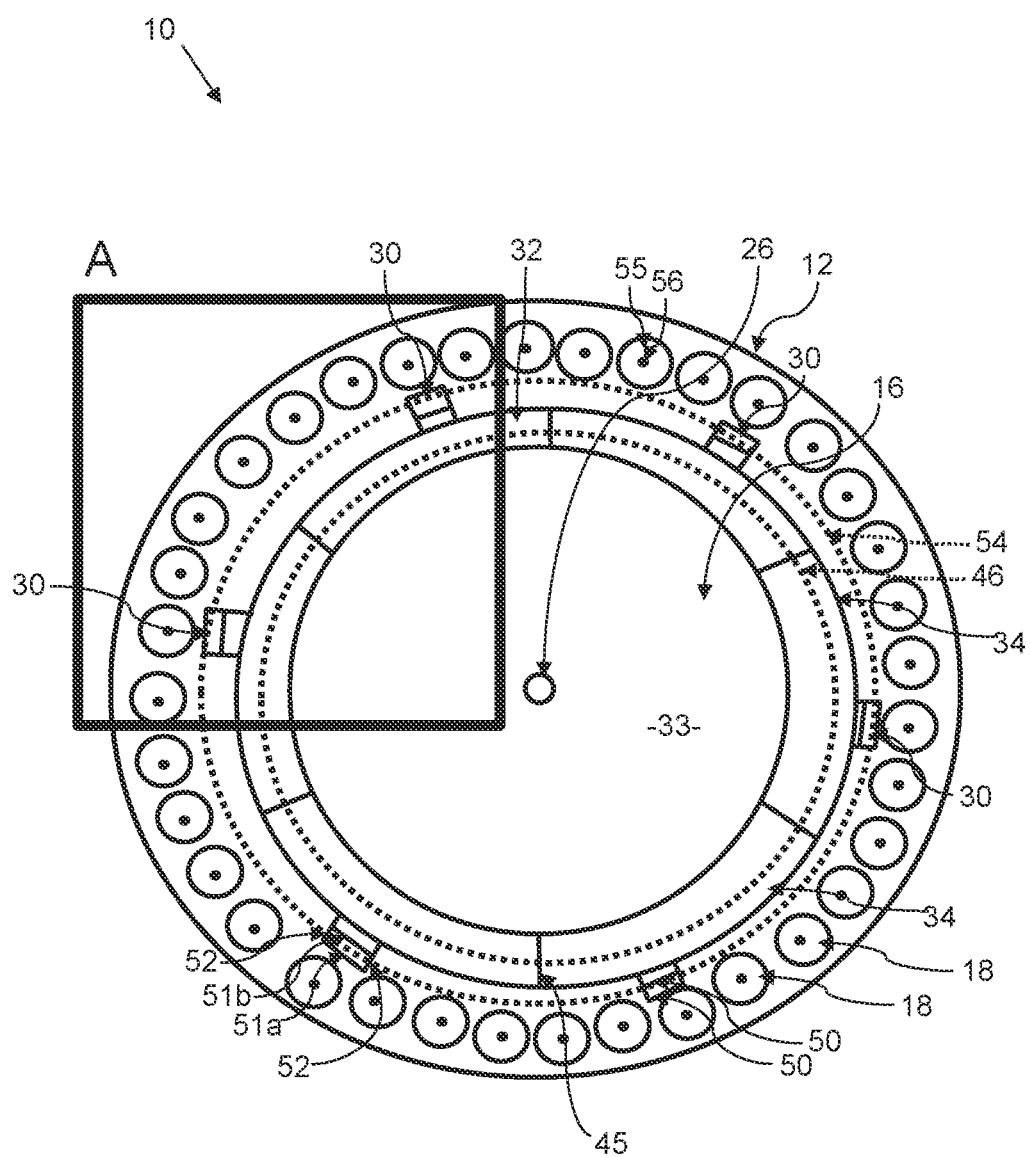
FIG. 3 shows a cutaway plan representation of the motor apparatus of FIG. 1 with the locking mechanism omitted for clarity.

The plurality of rotor magnets 34 is arranged or arrangeable to form a shape. Preferably, the shape is a circle or arcs thereof, although any non-circular shape may be envisioned, such as a polygon. FIG. 3 shows the rotor magnets 34 forming a continuous circle, each rotor magnet 34 being an arc of the circle. For clarity, the circle of the first rotor element 32 may be referred as a notionally first circle 46, shown in a dotted line in FIG. 3. The centre of the first circle 46 preferably coincides with at least one of, and preferably all of: the rotor-axis 26 and the housing-axis 23. Along the first circle 46, the outward-facing polar surface 40 of each rotor magnet 34 is of opposite polarity to the outward-facing polar surface 40 of the consecutive rotor magnet 34. Thus, the polarity of the outward-facing polar surfaces 40 alternates around the first circle 46.

Each shielding element 30 may also be referred to as a negator. A negator or shielding element 30 may prevent or inhibit a segment or urging element 18 which is being turned, from being attracted to a mover or rotor magnet 34. It does this by being of opposite polarity to the segment or urging element 18 and/or by being positioned between the segment or urging element 18 and the mover or rotor magnet 34. The function of a shielding element 30 will be clarified further herein.

Each shielding element 30 has at least one magnet 48, also referred to as a negator magnet. Similarly to a rotor magnet 34 of the first rotor element 32, each negator magnet 48 of the shielding element 30 has a negator magnet body 49. Each negator magnet body 49 has two negator magnetic poles 50, a negator outward-facing surface 51a, a negator inward-facing surface 51b, two negator side surfaces 52, a negator top surface 53a and a negator bottom surface 53b. The bottom surface 53b of each negator magnet 48 is connected or connectable with the or one of the platform elements 33. The negator outward-facing surface 51a and the negator inward-facing surface 51b are polarised, in other words, they are or contain at least part of one of the magnetic poles of the magnet 48. Thus, the negator outward-facing surface 51a and the negator inward-facing surface 51b may be referred to as the negator outward-facing polar surface 51a and the negator inward-facing polar surface 51b, respectively. At least one, and preferably all the negator magnets 48 are arcuate or arc magnets, but part arcuate or non-arcuate magnets are possible, such as cuboids or prisms.

Unlike the first rotor element 32, the negator top surface 53a of each negator magnet 48 is not connected or connectable with the or one of the platform elements 33 but this alternative may be envisioned.

There is preferably a plurality of shielding elements 30, and more preferably, there are as many shielding elements 30 as there are rotor magnets 34 and/or distinct polarities of the rotor element 16. In this case, there are six shielding elements 30. The magnets 48 are arranged or arrangeable to be radially outwardly of the rotor-axis 26 and/or of the first rotor element 32. More preferably, the plurality of shielding elements 30 is arranged or arrangeable in or substantially in a shape. The shape is preferably a circle or arcs thereof, although a non-circle, such as a polygon, is an option. For clarity, the circle of shielding elements 30 is referred to as a notionally second circle 54, shown as a dotted line in FIG. 3. The second circle 54 is concentrically around the first rotor element 32. Each negator magnet 48 extends along an arc of the second circle 54. The arc length of each negator magnet 48 is a, preferably minor, portion of the arc length of a said rotor magnet 34, as shown in FIG. 3.

The negator magnets 48 are spaced apart from each other along the second circle 54. Their polarity preferably also alternates along the second circle 54.

The negator inward-facing surface 51b of each negator magnet 48 is positioned or positionable to face an outward-facing surface 40 of a rotor magnet 34. The negator inward-facing surface 51b is preferably radially spaced-apart from the rotor outward-facing surface 40. Each negator magnet 48 is positioned or positionable spaced apart from a junction 45 of the first rotor element 32 but anywhere along the arc length of a rotor magnet may be envisioned, such as at or adjacent to a junction. More preferably, each negator magnet 48 is or is substantially equidistant between two consecutive junctions 45. In the shown embodiment, the, each, or at least one negator magnet 48 is offset by an angle relative to either of the closest two junctions 45. The angle may be in the range of 0° to 60° although any angle outside this range may be envisioned. Preferably, the angle may be in the range of 10° to 50°, and more preferably in the range of 20° to 40°. Most preferably, the angle is or is approximately 30°. The angle may be fixed, fixable, or changeable.

Furthermore, each negator magnet 48 preferably overlaps with only one rotor magnet 34 of the first rotor element 32 but this is optional. In other words, each negator magnet 48 does not or not significantly overlap a junction 45. However, if a negator magnet were to overlap a junction 45, the extent of overlap may be symmetric or asymmetric about the junction. The position of each negator magnet 48 relative to a corresponding rotor magnet 34 is similar or identical for all negator magnets 48 but this is optional.

As previously mentioned, the motor apparatus 10 comprises at least one urging element 18. Each urging element 18 may be referred to as a segment. In the shown embodiment, there are thirty-six urging elements 18 but any alternative number may be envisioned.

The plurality of urging elements 18 is arranged radially outwardly of the first rotor element 32 and/or of the plurality of shielding elements 30. In other words, the urging elements 18 are disposed, arranged or arrangeable to be in a, notionally third, circle or polygon or substantially a circle or polygon, although any other non-circular and non-polygonal shape may be envisioned. The third circle or polygon is concentrically around the first rotor element 32 and/or the shielding elements 30. The urging elements 18 are preferably equally spaced-apart around the circumference of the circle or polygon but this is optional.

Each urging element 18 includes at least one urging magnet 55, referred to as an urging magnet 55 respectively, for clarity. A plurality of urging magnets 55 per urging element 18 may optionally be provided, for example axially overlying each other. Each, or at least one urging magnet 55 is more preferably a permanent magnet but a non-permanent magnet may be envisioned. Thus, the segments, the mover and the negators are preferably permanent magnets.

Each urging element 18 also has an axle or axis of rotation 56 around which the urging element 18 is rotatable. Non-rotatable is an option, however. The axis of rotation 56 of an urging element 18 may be referred to as a peripheral axis of rotation for clarity.

Figure 4:
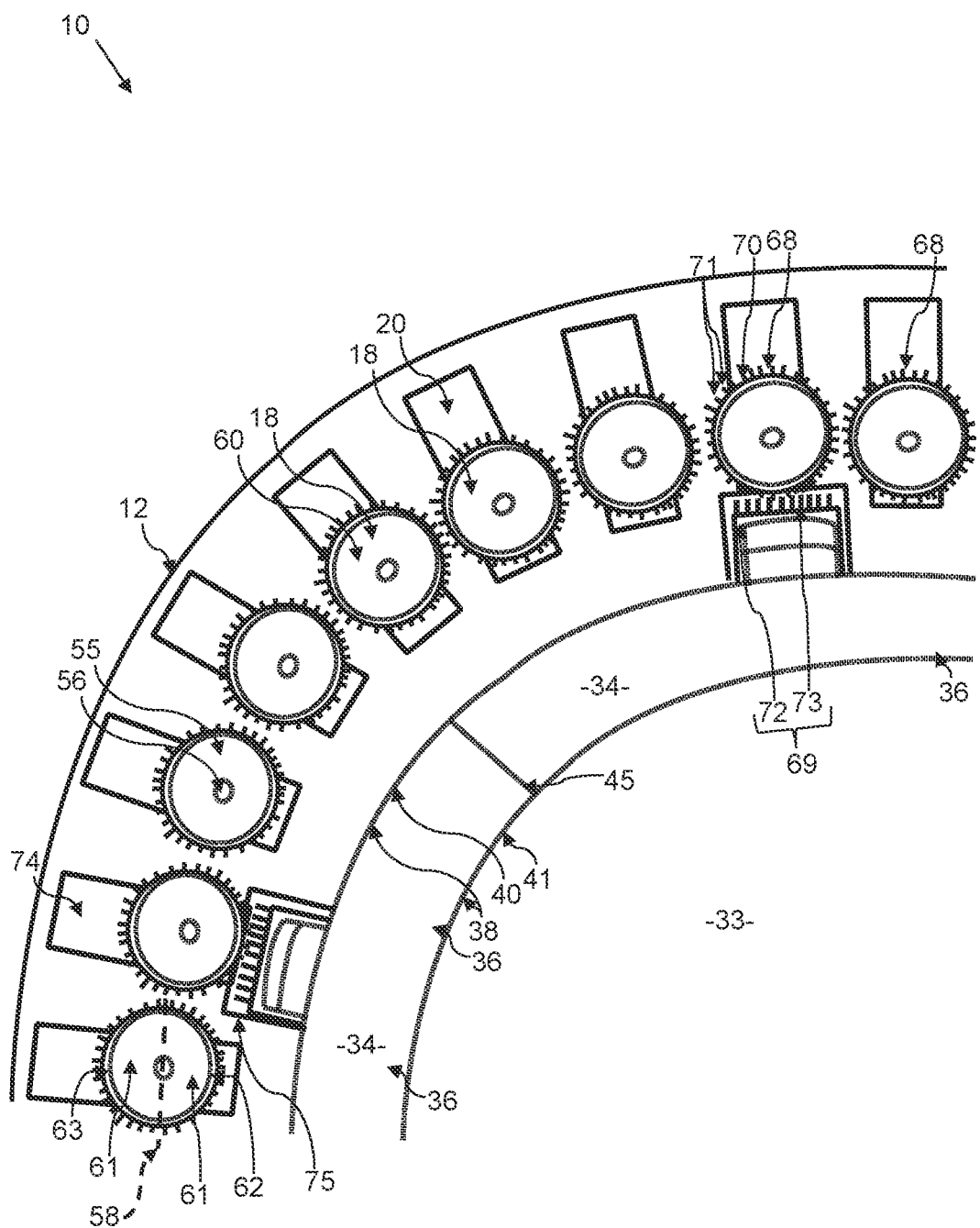
FIG. 4 illustrates a close-up representation of rectangle A of FIG. 3 in which the locking mechanism is shown, and in which the urging magnets, the axis of rotation of each urging element, rotor magnets and shielding element magnets are represented in dashed lines for clarity.

Each urging element 18 also has an axial length. Any plane which includes or is parallel to the peripheral axis of rotation 56 may be referred to as an urging axial plane 58. An example of an urging axial plane is shown in FIG. 4, with the urging axial plane 58 indicated as a dashed line. Any plane which intersects, preferably perpendicularly, the peripheral axis of rotation 56 may be referred to as an urging transverse plane. The, each or at least one peripheral axis of rotation 56 is preferably fixed or non-movable relative to the housing 12 and/or relative to the central axis of rotation 26. Optionally, if at least one wall of the housing 12 is formed of a plurality of wall sub-portions, at least one urging element 18 may be associated with the, each, or at least one wall sub-portion. Each urging magnet 55 has at least one urging magnet body 60. Each urging magnet body 60 has two urging magnetic poles 61, an urging first surface 62, an urging second surface 63, an urging top surface 64 and an urging bottom surface 65.

The urging first surface 62 and the urging second surface 63 are polarised, in other words, they are, provide a support for or contain at least part of one of the urging magnetic poles 61 of the urging magnet 55. Thus, the urging first surface 62 and the urging second surface 63 may be referred to as the first polar surface 62 and the second polar surface 63. The first polar surface 62 has a "north" polarity and the second polar surface 63 has a "south" polarity, but the opposite may easily be envisioned.

At least one, and preferably all the urging magnets 55 are cylindrical or substantially cylindrical, but non-cylindrical is possible, such as cuboidal. The urging first surface 62 and the urging second surface 63 are preferably at least partly curved but non-curved is an option. In the preferred embodiment, the urging first surface 62 and the urging second surface 63 meet each other along an urging axial plane 58. The start and end of the urging first surface 62 may be indistinguishable from the start and end of the urging second surface 63. Thus, the two urging magnetic poles 61 are positioned on either side of an urging axial plane 58.

The locking mechanism 20 in-use controls the rotation of the plurality of rotatable urging elements 18. In the preferred embodiment, the locking means, locking mechanism or lock 20 comprises a rotation-imparting element or part 66 and a blocking element or part 67 but either element may be omitted or both elements may be combined into a single element or part which may function as both the rotation-imparting element and the blocking element.

The rotation-imparting element 66 may be referred to as a turning device. The rotation-imparting element 66 in-use enables or causes the rotation of the or each urging element 18 by imparting a rotational force thereto. Preferably, the rotation-imparting element 66 comprises a first rotation-imparting portion 68 and a second rotation-imparting portion 69, but either may be omitted and/or a plurality of either may be provided.

The or each first rotation-imparting portion 68 is associated with a said urging element 18. There is preferably a first rotation-imparting portion 68 associated with each urging element 18. Thus, in the shown embodiment, the rotation-imparting element 66 has thirty-six first rotation-imparting portions 68. Preferably, each first rotation-imparting portion 68 comprises at least one wheel element or wheel 70.

The or each wheel 70 is abuttable against, connectable or connected with, attachable or attached to a said rotatable urging element 18, and more preferably with the peripheral axis of rotation or axle 56 thereof. Preferably, the wheel 70 is concentric with the peripheral axis of rotation 56. In other words, a central axis of the wheel 70 is on or around the peripheral axis of rotation 56, but offset therefrom is possible. The, each or at least one wheel 70 comprises one or more peripheral teeth 71 at its periphery. Thus, the wheel is a cogged wheel or toothed wheel 70. However, teeth may be omitted. For example, friction may be sufficient to rotate a toothless wheel.

The or each second rotation-imparting portion 69 may be referred to as a turner. Thus, the mechanical turning device 66 may comprise a turner 69. The or each second rotation-imparting portion 69 in-use interacts with the or each first rotation-imparting portion 68 to rotate a said urging element 18 via its associated first rotation-imparting portion 68. There are preferably as many second rotation-imparting portions 69 as there are rotor magnets 34 of the first rotor element 32 but this is optional. In the preferred embodiment, there are six second rotation-imparting portions 69 but any number may be provided, including none, one, two, three, four, five or more than six.

The or each second rotation-imparting portion 69 is preferably associated with the rotor element 16. More preferably, the or each second rotation-imparting portion 69 is connectable, connected to, on and/or at least associated with the rotor-support 28. The second rotation-imparting portions 69 are preferably regularly spaced-apart around the rotor-support 28 but this is optional. In the case of a single second rotation-imparting portion, the second rotation-imparting portion may comprise a discrete portion extending around a section of the rotor element 16 or may be continuous around the whole or substantially whole circumferential extent of the rotor element 16.

As shown, each or at least one second rotation-imparting portion 69 is preferably non-overlapping with a junction 45. More preferably, each or at least one second rotation-imparting portion 69 may be spaced-apart from a junction 45, although at or adjacent thereto may be an option. Even more preferably, each or at least one second rotation-imparting portion 69 is equidistant from two consecutive junctions. In the shown embodiment, the or each second rotation-imparting portion 69 is offset by an angle relative to either of the closest two junctions 45. The angle may be in the range of 0° to 60° although any angle outside this range may be envisioned. Preferably, the angle may be in the range of 10° to 50°, and more preferably in the range of 20° to 40°. Most preferably, the angle is or is approximately 30°. The angle may be fixed, fixable, or changeable.

Furthermore, the or each second rotation-imparting portion 69 overlaps any of: perimetrically, radially, and axially with a said shielding element 30 in the preferred embodiment. More preferably, at least part of the or each second rotation-imparting portion 69 is preferably positioned on or beneath a said shielding element 30 but this is optional. The or each second rotation-imparting portion 69 comprises a support 72 and an array of teeth 73 integrally formed therewith, connected or connectable thereto, although either feature may be omitted.

The array of teeth or toothed arc 73 extends radially outwardly relative to the rotor element 16. In the shown embodiment, the array of teeth 73 is radially and axially positioned in order to be able to engage with each or at least one said first rotation-imparting portion 68 per urging element 18. In other words, the array of teeth 73 is arranged to be temporarily engageable with the peripheral teeth 71 of the wheel 70 for rotating the associated rotatable urging element 18 via the wheel 70. The number of teeth per array 73 and/or their spacing along a length of the array 73 is selected so that interaction in-use of the first and second rotation-imparting portions 68,69 imparts a rotation to the urging element 18 sufficient to alter the polarity thereof. In the preferred embodiment, the urging element 18 is rotated by 180° as each urging element 18 only has two poles. A greater number of poles may result in the urging element being rotated by an angle smaller than 180°, as required.

The blocking element 67 in-use selectively locks, prevents, inhibits or blocks rotation of a said urging element 18. The blocking element 67 may be referred to as a locking device. The segments or urging elements 18, each having an axle or axis 56, at least part of the locking device and at least part of the turning device may optionally be referred to as a stator.

The blocking element 67 comprises at least one first blocking portion 74 and at least one second blocking portion 75, although either portion may be omitted or both blocking portions may be combined into a single portion fulfilling the function of each blocking portion.

The first blocking portion 74 is configured to interact with the second blocking portion 75. A said first blocking portion 74 is associated with each urging element 18. Thus, there are there thirty-six first blocking portions 74 in the preferred embodiment, but any alternative number may be an option. Each first blocking portion 74 comprises a moving or movable part 76, a blocking portion support 77 and a biasing means 78 but any of these features may be omitted.

The movable part 76 is arranged or arrangeable to be movable between an engaged condition and a disengaged condition. In the disengaged condition, the movable part 76 permits the urging element 18 to be rotatable. In the engaged condition, the movable part 76 prevents or inhibits the urging element 18 from being rotatable. The movable part 76 may prevent or inhibit rotation by any means known to the Person Skilled in the Art. For example, the movable part 76 may be movable to selectively abut or press against an urging element 18, such that rotation is prevented or inhibited by friction. In addition to or as an alternative to friction, a clamping means or clamp, a fastener, a stop or block may be envisioned, by way of example only. The movable part 76 may take any shape or form as long as it can be moved or actuated between an engaged condition and a disengaged condition with the urging element 18.

The movable part 76 comprises a projection, protrusion, tongue, latch or arm in the preferred embodiment. Preferably the arm or latch is a pivotable arm or latch. In other words, the first blocking portion 74 may comprise a hinge or pivot axis but this is optional. The movable part 76 is mounted or mountable to the blocking portion support 77. Thus, a mechanical locking device or blocking element 67 may comprise a locking arm that can pivot on or relative to the casing 12.

The biasing means, mechanism, or biasor 78 in-use maintains the movable part 76 in the engaged condition or, if the movable part 76 is in the or a disengaged condition, the biasing means 78 exerts a biasing force to bias the movable part 76 towards the engaged condition. The biasing means 78 comprises at least one spring in the shown embodiment, and more preferably at least one extension spring. Thus, the movable part 76 may be referred to as a pivotable, spring-loaded locking latch. However, any alternative spring and/or any non-spring biasing means may be envisioned, such as an elastic band, an actuator, or a counterweight system. Alternatively, the movable part may be formed at least in part of an elastically deformable material such that it has no pivot or hinge.

Figure 5:
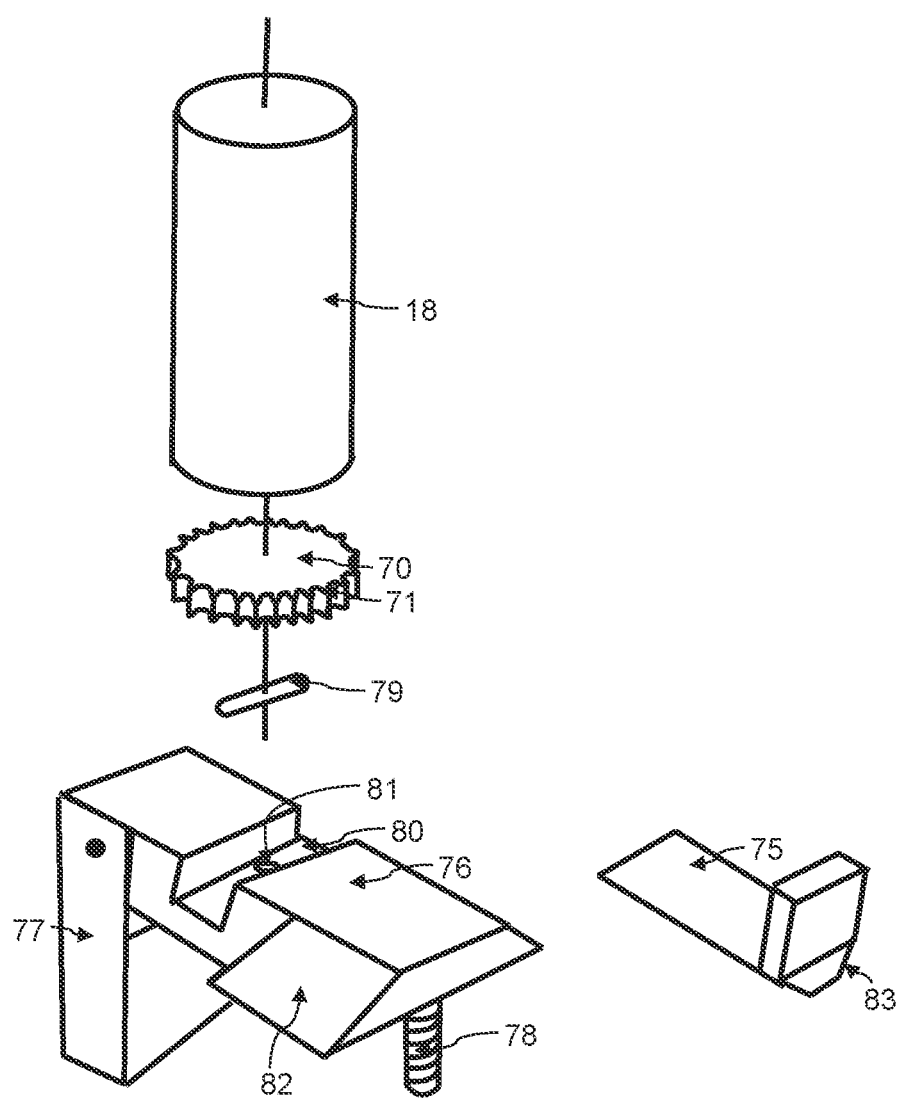
FIG. 5 shows a perspective exploded representation of part of the locking mechanism and an urging element.

The first blocking portion 74 further comprises an anti-rotation element or part 79 and a stop element or part 80 engageable with the anti-rotation element 79 but either or both features are, once again, optional. The anti-rotation element 79 and the stop element 80 may interact to prevent or inhibit rotation of an urging element 18. The anti-rotation element 79 and a stop element 80 are visible in FIG. 5.

The anti-rotation element 79 is preferably integrally formed with, associated with and/or connected or connectable to the urging element 18 whilst the stop element 80 is integrally formed with, associated with and/or connected or connectable to the first blocking portion 74, and more preferably the movable part 76 thereof, or vice-versa.

The anti-rotation element 79 comprises at least one slat, peg, tooth, bar, pole or other elongate element or portion in the present embodiment, but any alternative may be envisioned, such as a groove, or slit. The stop element 80 comprises at least one recess, slit, groove, or abuttable block. The stop element 80 is dimensioned and/or positioned such that the anti-rotation element 79 can be received within and/or can be abuttable thereagainst. Optionally, the stop element 80 further comprises a through-bore or slit 81 for receiving the peripheral axis of rotation 56 therethrough.

Thus, the mechanical locking device or blocking element 67 may comprise one or more locking pegs that may be attached to the segment's axle 56 and which engage with the locking arm to prevent the segment 18 from turning. The locking pegs may also ensure that the segment's polar surface faces the rotor 16.

The second blocking portion 75 in-use interacts with the first blocking portion 74 to move or actuate the movable part 76 thereof from the engaged condition into or towards the disengaged condition. The second blocking portion 75 may be referred to as a trigger, a disengagement element, a deflecting element, a deflector, or an unblocking element, for clarity.

The triggers, turners and negators may optionally be collectively referred to as the assembly. The assembly is preferably associated with the rotor element 16 and may optionally even be considered to be part thereof.

Each second blocking portion 75 in the preferred embodiment comprises a projection or protrusion positioned and dimensioned so as to impart a force to the movable part 76 to counter the force of the biasing means 78. Each second blocking portion 75 is connected or connectable to the rotor element 16, and more preferably to the rotor-support 28. The second blocking portion 75 is preferably positioned at or adjacent to any or any combination of: a said second rotation-imparting portion 69, and a shielding element 30, preferably all three as best illustrated in FIG. 4. More preferably, each, or at least one second blocking portion 75 is or is substantially equidistant between two consecutive junctions 45. In the shown embodiment, the, each, or at least one second blocking portion 75 is offset by an angle relative to either of the closest two junctions 45. The angle may be in the range of 0° to 60° although any angle outside this range may be envisioned. Preferably, the angle may be in the range of 10° to 50°, and more preferably in the range of 20° to 40°. Most preferably, the angle is or is approximately 30°. The angle may be fixed, fixable, or changeable. In the shown embodiment, the second blocking portion 75 is or is substantially at the same axial elevation as the movable part 76 in the engaged condition.

In the shown embodiment, the second blocking portion 75 includes a cantilevered, fixed arm or latch. In other words, the mechanical trigger 75 may comprise an arm that unlocks a segment 18, allowing the segment 18 to turn. The fixed arm preferably extends from the rotor element 16, at least partly radially outwardly and/or at least partly axially. The fixed cantilevered arm is arranged to be temporarily engageable with the movable part 76 to exert a force thereagainst in use. There are preferably as many second blocking portions 75 as there are rotor magnets 34, but this is optional. Thus, there are preferably six second blocking portions 75.

Optionally, the second blocking portion 75 may comprise at least one sloped or oblique surface or a curved surface 82. Optionally, a portion of the pivotable arm, preferably at or adjacent to the free end of the cantilevered movable part 76, may have a similar sloped or oblique surface or curved surface 83. In other words, at least a part of either or both the disengagement element or part 75 and the movable part 76 may have a lateral cross-sectional shape which may be one of: a trapezium, a trapezoid, and a triangle. The function of either or both surfaces 82,83 will be explained herein.

In-use, the motor apparatus 10 needs to be assembled, if not already assembled. assembly involves carrying out at least some of the following steps, not necessarily in the following order.

The first rotation-imparting portions 68, which are the cogged wheels 70 in the preferred embodiment, are connected to the urging elements 18. Similarly, the second rotation-imparting portions 69, which are the arrays of teeth in the present embodiment, are connected to the rotor element 16 if not already integrally formed therewith.

The first blocking portion 74 is assembled and connected to the motor housing 12 if not integrally formed therewith. The second blocking portion 75 is connected to the rotor-support 28 if not integrally formed therewith. If an anti-rotation element 79, such as a peg, is provided, the anti-rotation element 79 is connected to an urging element 18.

The rotor magnets 34 are assembled to form the first rotor element 32. The rotor element 16 is assembled by connecting the shielding element 30 and the first rotor element 32 to the rotor-support 28.

The output means 14, which is here an output shaft 24, is connected to the rotor element 16 and the motor housing 12. The urging elements 18 are inserted into the housing 12. Preferably, the polarity of urging elements 18 alternates sequentially along the circle of urging elements 18.

To disassemble the motor apparatus 10, the above steps may be done in reverse.

To use the assembled motor apparatus 10, an initial force or electricity may need to be imparted to cause the rotor element 16 to rotate. This can be done in an automated manner, such as via a secondary motor. Alternatively, this can be done manually, such as via the user briefly rotating the output means 14 and/or the rotor element 16.

The rotor element 16 begins to rotate about the rotor-axis 26 in a direction of rotation which may be anti-clockwise or, as shown in the illustrated embodiment, clockwise. The output means 14 rotates with the rotor element 16, thereby providing a mechanical output.

The second rotation-imparting portions 69, here the array of teeth 73 on the rotor-support 28, begin to rotate with the rotor element 16. The following process will be described for one second rotation-imparting portion 69 for clarity, but it is clear that all second rotation-imparting portions 69 undergo the same or similar process, preferably at or substantially at similar times.

The second rotation-imparting portion 69 rotates until it encounters a first rotation-imparting portion 68, which is preferably a cogged wheel 70 mounted on a said urging element 18.

By default, each movable part 76, which is preferably a pivotable arm, is in the engaged condition with its respective urging element 18. The urging element 18 is therefore prevented or inhibited from rotating, as is the first rotation-imparting portion 68 which is a cogged wheel 70 in the preferred embodiment. The urging element 18 is locked.

If the movable part 76 remains in the engaged condition upon engagement of the teeth of the first rotation-imparting portion 68 and second rotation-imparting portion 69, the first rotation-imparting portion 68 prevents or inhibits further rotation of the rotor element 16. The second blocking portion or trigger 75 prevents the above situation by interacting with the first blocking portion 74.

More preferably, the trigger 75 moves or actuates the movable part 76 into or towards the disengaged condition. In the shown embodiment, the trigger 75 slides or translates relative to the pivotable arm and, by attempting to occupy at least in part the same physical space, imparts a force to counter the biasing force of the biasing means 78. The trigger 75 pushes the pivotable arm away from the engaged position, whether to the side, upwardly, or preferably, downwardly as shown. In other words, the pivotable arm is depressed by the trigger 75.

The oblique surface 82, 83 on one or both the pivotable arm and the fixed arm may enable and/or facilitate the translation of the trigger 75 relative to the movable part 76, particularly if positioned at or adjacent to a leading edge of the trigger 75 and/or of the movable part 76. In the shown embodiment, two oblique surfaces 82, 83 are provided on both the pivotable arm and the fixed arm to accommodate either direction of rotation of the rotor 16.

When the movable part 76 is in the disengaged condition, the anti-rotation element 79 and the stop element 80, if provided, are also disengaged from each other. The urging element or segment 18 is unlocked and can be rotated.

As the rotor element 16 rotates, the array of teeth 73 of the second rotation-imparting portion 69 engages with and causes the first rotation-imparting portion 68, here the wheel 70, to rotate. In this case, the urging element or segment 18 is rotated by or by about 180° about its peripheral axis of rotation 56. Thus, upon rotation of each rotatable urging element 18, each said pole 61 of the rotatable urging element 18 in-use alternatingly faces the rotor element 16 to impart an urging force thereon.

As the rotor element 16 continues to rotate, the trigger 75 and the movable part 76 disengage. As the biasing force is unopposed, the biasing means 78 biases the movable part 76 back towards the engaged condition. The movable part 76 remains in the engaged condition until the or the sequentially next trigger 75 moves the movable part 76 away from the engaged condition and into the disengaged condition.

Preferably, the extent of the array of teeth 73 matches or substantially matches a circumferential extent of the wheel 70 necessary to cause a rotation sufficient to alter the polarity of the urging element 18. In other words, the length of the array of teeth 73 is approximately half the circumferential extent of the wheel 70 in the preferred embodiment. Thus, by the time the movable part 76 returns to the engaged condition, the array of teeth 73 has disengaged from the teeth of the wheel 70.

As the array of teeth 73 is spaced apart from the subsequent array of teeth 73, and the space between arrays 73 along the rotor-support 28 is preferably devoid of teeth, the locked wheel 70 does not prevent or inhibit the rotor element 16 from rotating.

As the rotor element 16 continues to rotate, the trigger 75 encounters the movable part 76 associated with a, notionally second, urging element 18. The second urging element 18 is adjacent to the notionally first urging element 18 the polarity of which has just been changed. In other words, the second urging element 18 is sequentially next in order.

The trigger 75 temporarily moves the pivotable arm away from the engaged condition. Simultaneously or substantially simultaneously, whilst the pivotable arm is in the disengaged condition, the array of teeth 73 causes the wheel 70, and thereby the second urging element 18 to be rotated, preferably also by 180°. Detailed description of the common features is omitted for brevity. After the urging element 18 has been rotated, the movable part 76 returns to the engaged condition.

As the rotor element 16 continues to rotate, the trigger 75 encounters the movable part 76 of a, notionally third, urging element 18. The same steps as for the first urging element 18 are repeated for the third and each subsequent urging element 18 in turn. For brevity, the steps are not repeated here.

As there is preferably a plurality of triggers 75 and a plurality of arrays of teeth 73, these steps are repeated simultaneously or substantially simultaneously for a plurality of different urging elements 18.

There may be energy losses, such as due to heat and/or friction. Failing to compensate for these energy losses may be one way to stop the motor apparatus 10. A braking mechanism, such as an abutment element or friction element, whether manual or automatic, may optionally be provided for preventing or stopping rotation of the rotor element. An example of a braking mechanism may include a friction pad. Kinetic energy may be removed to slow the motor apparatus. The kinetic energy may even be converted into another, storable energy form, such as electricity.

However, the losses may be compensated for. For example, the user may manually or non-manually impart additional energy and/or force to rotate or increase the rotational velocity of the rotor element 16. Alternatively or additionally, the secondary motor or a further motor or motor element may provide the additional energy and/or force. Convection currents, such as due to heat differentials may additionally or alternatively at least partly compensate for energy losses.

Preferably, however, the energy losses are at least partly minimised or compensated for by the arrangement of the urging elements 18, and optionally the shielding elements 30. In other words, the urging elements 18, and optionally the shielding elements maintain at least some of the rotational inertia or momentum of the rotor element 16, as explained as follows.

The first rotor element 32 is formed of rotor magnets 34. The rotor magnets 34 are arranged such that the rotor outward-facing surface 40 of one rotor magnet 34 differs in polarity from the rotor outward-facing surface 40 of a neighbouring rotor magnet 34. This results in the first rotor element 32 having alternating polarity along the first circle 46. In other words, consecutive arcs or sectors of the first circle 46 have a different polarity. In the shown embodiment, there are six rotor magnets 34. Therefore three rotor outward-facing surfaces 40 have a "north" pole and three rotor outward-facing surfaces 40 have a "south" pole. The "north" rotor outward-facing surfaces 40 are spaced apart from each other by the "south" rotor outward-facing surfaces 40.

The urging elements 18 are positioned radially outwards of the rotor element 16. As the urging elements 18 are preferably regularly spaced-apart along the third circle, there is preferably an equal number of urging elements 18 facing each first circle arc or rotor magnet 34. In the present embodiment, there are six urging elements 18 facing each first circle arc, but more or fewer per arc may be envisioned. Preferably, at least one of the urging elements 18 facing a common first circle arc has their first polar surface 62 facing or oriented towards the rotor element 16. Preferably, at least one of the urging elements 18 facing a common first circle arc has their second polar surface 63 facing or oriented towards the rotor element 16. In other words, at least two urging elements 18 facing a common first circle arc have opposite polarity to each other, although all urging elements facing a common circle arc may have the same polarity in an alternative embodiment. Thus, the "north" first polar surface 62 of at least one urging element 18 faces a "north" rotor outward-facing surface 40 of a rotor magnet 34, and vice versa. The same polarity creates a repulsive magnetic force therebetween. Similarly, at least one "south" urging element 18 faces the "north" rotor outward-facing surface 40 of a rotor magnet 34, and vice-versa. This at least one urging element 18 may therefore create an attractive magnetic force on the magnet 34 of opposite polarity.

Furthermore, at least one urging element 18 has their "south" second polar surface 63 facing the "south" rotor outward-facing surface 40 of the neighbouring rotor magnet 34. This at least one urging element 18 may therefore create an attractive magnetic force to at least one neighbouring rotor magnet 34 of opposite polarity.

In other words, permanent magnets have two poles, named North and South. When two magnets come in close proximity to each other, they either repel or attract each other because like or same poles (i.e.: both North or both South) repel each other. Unlike or opposite poles (i.e.: the North of one and the South of the other) attract each other.

The repulsive and/or attractive forces create an unsteady state. As a result, a net urging force is created. The net urging force urges the rotor element 16 to be put into motion and/or an existing rotary movement may be at least partly sustained. When the motor apparatus 10 is running, the segments or urging elements 18 opposite the negators or shielding elements 30 are turned by this motion of the rotor element 16, flipping their polar surface and this maintains the situation that causes the rotor element 16 to turn and/or maintain its rotational momentum at least in part. It may be possible for the user to select or change the orientation of an urging element 18, for example to initiate or prevent rotation of the rotor 16, but this is entirely optional. The user may also be able to select or change the position of a negator, fixed arm, and/or array of teeth relative to the rotor element, but this is also optional.

In the absence of any locking mechanism 20, the urging elements 18 which would be freely rotatable in the first case, would rotate to present their polar surface 62,63 of opposite polarity to the polarity of the rotor outward-facing surface 40 of the closest rotor magnet 34.

Alternatively, in a second case, a rotor element 16 having a "north" rotor outward-facing surface 40 would rotate until the "north" rotor outward-facing surface 40 faces the "south" second polar surface 63 of the greatest number of urging elements 18 as possible, and vice-versa. For instance, this may occur if the urging elements 18 are prevented from rotating but the rotor element 16 is freely rotatable.

Figure 6A:
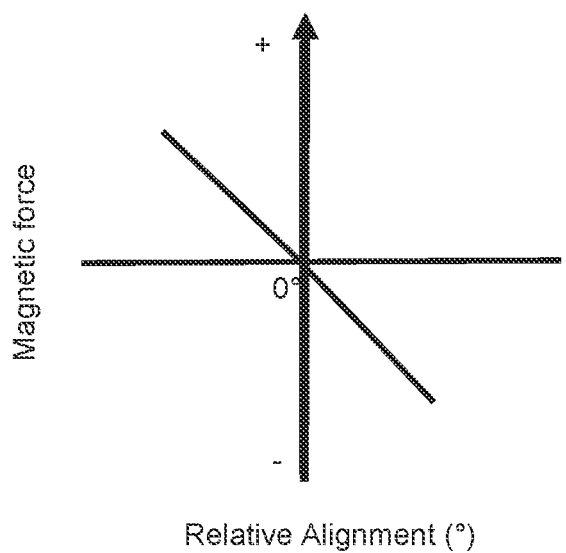
FIG. 6a is a graph of the magnetic force as a function of the relative alignment of a rotor magnet relative to an adjacent subset of urging elements of a motor apparatus in which the urging elements are non-rotatable but the rotor element is freely rotatable g.
Figure 6B:
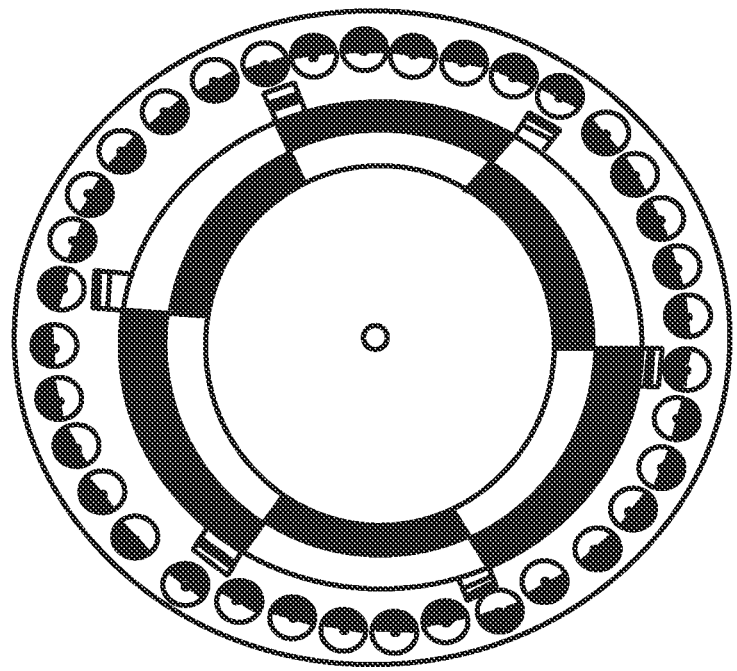
FIG. 6b illustrates a cutaway plan representation of an embodiment of a motor apparatus in-use, in a stop condition, in which the north pole of each magnet is shown in black and the south pole of each magnet is shown in white, with a locking mechanism omitted for clarity.

In both cases, the rotor element 16 would then cease to rotate. This is an equilibrium or steady-state, also referred to as a "stop" condition. FIG. 6*a* illustrates the second case and FIG. 6*b* shows a cutaway view of an embodiment of a motor apparatus in a stop condition. The embodiment of the motor apparatus may be in accordance with the present invention if the angle between a junction and any or all of: a negator, a second rotation-imparting portion, and a second blocking portion is selectable and/or changeable.

In FIG. 6*a*, the x-axis represents the misalignment between the polar surface of a group of urging elements 18 and the common rotor outward-facing surface of a given rotor magnet. The y-axis represents the magnetic force of the rotor magnet 34, with positive being a magnetic force in the counter-clockwise direction and negative being a magnetic force in the clockwise direction. In FIG. 6*b*, black represents the north pole and white the south pole of each magnet. When a "north" rotor outward-facing surface 40 faces exactly, and preferably only, or the greatest possible number of "south" polar surfaces of a group of urging elements 18, or vice-versa, the magnetic attraction between the facing urging elements 18 and the rotor magnet 34 is strongest. The rotor magnet 34 is in the stop condition and the relative alignment or the misalignment is 0°. The magnetic force to turn the rotor magnet 34 is therefore also 0. The "stop" condition is the intersection of the x-axis and the y-axis in FIG. 6*a*.

When rotated away from the "stop" condition, the rotor magnet 34 will be in an unsteady state. In the unsteady state, the rotor element is biased by the magnetic forces, repulsive and/or attractive, to return to the "stop" condition by rotating clockwise or anti-clockwise, depending on the relative strengths of the magnetic forces and the direction of the misalignment angle.

When the rotor magnet 34 is rotated clockwise relative to the stop condition, a counterclockwise restoring magnetic force is exerted on the rotor magnet 34. The rotor magnet 34 therefore has counterclockwise angular velocity, to return to the stop condition. This corresponds to the portion of the graph to the left of the y-axis. As the misalignment increases, the restoring magnetic force increases. The restoring force is strongest when the "north" rotor outward-facing surface 40 faces exactly, and preferably only, or the greatest number possible of, "north" polar surfaces of a group of urging elements 18. Further rotation of the rotor magnet 34 would result in a flipping of the restoring magnetic force.

The portion of the graph to the right of the y-axis represents the symmetrical situation whereby the rotor magnet 34 is displaced counterclockwise relative to the stop condition. Detailed description is omitted for brevity.

Figure 7A:
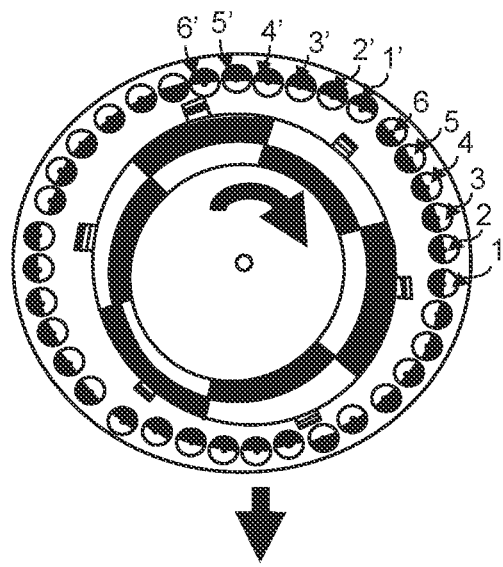
FIG. 7a shows a cutaway plan representation of the motor apparatus of FIG. 1, in-use, in which the rotor element is rotating clockwise, prior to a flipping event, with the locking mechanism omitted for clarity.

The locking mechanism 20 prevents the above cases by selectively permitting or preventing the rotation of the urging elements 18. This maintains the unsteady state and/or prevents or inhibits the rotor magnet 34 from reaching a "stop" condition, as explained herein, with the aid of FIGS. 7*a* to 7*c*.

The rotor element 16 rotates in one direction, which is clockwise in the shown embodiment. A group of, notionally six, urging elements 18 have their polar surface of same polarity facing the rotor magnets. For clarity, each of the six urging elements 18 of this first group is respectively referred to as a first urging element 1, second urging element 2, third urging element 3, fourth urging element 4, fifth urging element 5 and sixth urging element 6 consecutively. The numbering is adapted to the number of urging elements 18 provided per group. At least one, and more preferably three urging elements of the first group have a "north" first polar surface facing a, notionally first, "north" rotor outward-facing surface. In the shown embodiment in FIG. 7*a*, these three urging elements are the first urging element 1, second urging element 2, and third urging element 3. Furthermore, at least one, and more preferably three urging elements of the first group have a "north" first polar surface facing a, notionally second, "south" rotor outward-facing surface. In the shown embodiment in FIG. 7*a*, these three urging elements are the fourth urging element 4, fifth urging element 5 and sixth urging element 6.

A further, notionally six, urging elements 18 anticlockwise form a second, adjacent group of urging elements. The urging elements 18 of the second group may be similarly numbered as first urging element 1', second urging element 2', third urging element 3', fourth urging element 4', fifth urging element 5' and sixth urging element 6' for clarity. The numbering is adapted to the number of urging elements 18 provided per group. The first urging element 1', second urging element 2', third urging element 3' have their "south" polar surface facing the second, "south" rotor outward-facing surface. The fourth urging element 4', fifth urging element 5' and sixth urging element 6' have their "south" polar surface facing a, notionally third, "north" rotor outward-facing surface. Further groups of urging elements are similar to the first two groups of urging elements described in detail. Thus, detailed description is omitted for brevity. A group may contain an alternative number of urging elements. The number of urging elements may differ between groups.

Therefore, the, notionally first three, urging elements 18 of each group repulse the, notionally first, rotor magnet. The, notionally last three, urging elements 18 of each group attract the, notionally second, rotor magnet 34. In other words, the unlike polarities of the urging elements 18 attract the second rotor magnet 34 from ahead and the like polarities of the urging elements 18 repel the second rotor magnet 34 from behind. This is the situation shown in FIG. 7*a*.

Figure 7B:
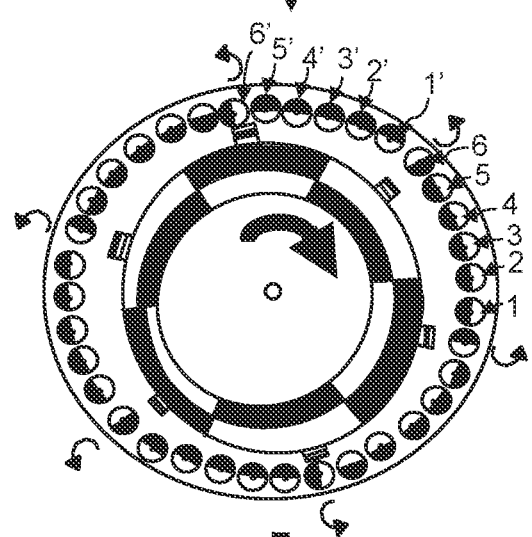
FIG. 7b shows the motor apparatus of FIG. 7a, in-use, during the flipping event.
Figure 7C:
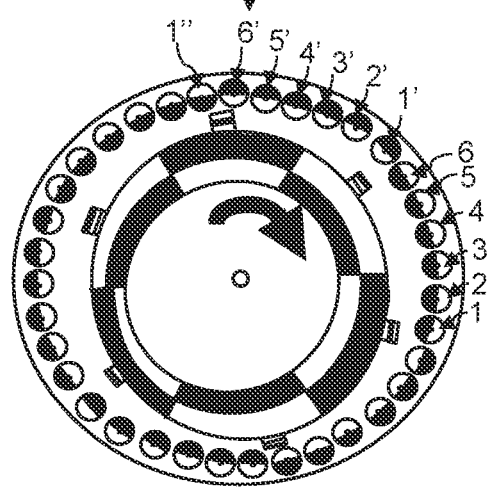
FIG. 7c shows the motor apparatus of FIG. 7b, in-use, after the flipping event.

As the rotor element 16 rotates, so does the second rotation-imparting portion 69 and the trigger 75. This causes the movable part 76 associated with one of the urging elements 18 of the first group to be disengaged and the urging element 18 to be rotated via the array of teeth 73 and the wheel 70. The polarity of the rotated urging element 18 flips. Preferably, the segment or urging element 18 is rotated by 180°. This is called a flipping event. FIG. 7*b* illustrates the motor apparatus 10 in which six urging elements 18 are undergoing a flipping event, indicated by the half-circle arrows. It will be understood that the direction of rotation of the urging elements is determined by the direction of rotation of the rotor 16, which is clockwise here but which could be counter-clockwise.

In other words, turning the rotor 16 causes the assembly to unlock the locking device of the next segment 18 to be flipped with the trigger. The polarity is flipped with the turner. The segment 18 is locked again. By flipping the segments or urging elements 18, the situation that produces the force to turn the rotor 16 is maintained, so the rotor 16 continues to turn, producing the output of the motor apparatus 10.

In the present embodiment, the flipped urging element 18 is preferably the last urging element 18 of the first group, in other words, the sixth urging element 6 of the first group, due to the location of the second rotation-imparting portion 69 and trigger 75. The sixth urging element 6 of the first group becomes the first urging element 1' of the second group. This is the situation shown in FIG. 7c, after the flipping event.

Simultaneously or substantially simultaneously, the sixth urging element 6' of the second group also preferably undergoes a similar flipping event to become the first urging element 1'' of a, notionally third, group of urging element 18.

Thus, the number of urging elements 18 in a group preferably remains constant. The penultimate urging element 18 of a group typically becomes the new last urging element 18 of the group whilst the previous last urging element 18 of the group becomes the first urging element 18 of the next group.

The sequential flipping events result in each urging magnetic pole 61 of the rotatable urging element 18 in-use alternatingly facing the rotor element 16 to impart an urging force thereon. The sequential flipping events also means that the unsteady state is maintained, such that the rotor element 16 moves continuously in one direction.

Each shielding element 30 may be completely omitted. However, a shielding element 30 may aid in maintaining the unsteady state. Each shielding element 30 is preferably the same or substantially the same diameter as an urging element 18. This enables the shielding element 30 to "shield" one urging element 18 at a time, but more than one at a time may be an option. The negator inward-facing surface 51b of the shielding element 30 preferably has the same polarity as the rotor outward-facing surface 40 of the rotor magnet 34 it faces, which in the case of the first rotor magnet 34 is "north". The shielding element 30 shields, disrupts or negates the magnetic attractive force of the shielded sixth urging element 18 upon the second rotor magnet 34 prior to the flipping event. Additionally or alternatively, the shielding element 30 shields, weakens, disrupts or negates the magnetic attractive force of the shielded first urging element 18 of the second group upon the first rotor magnet 34 after the flipping event. This may help the shielded urging element 18 to rotate in the first place. In other words, to aid the flipping of a Segment, it is shielded by a Negator which has a repelling pole facing the Mover.

The output of the motor apparatus 10 may be mechanical, electrical or both.

Figure 8:
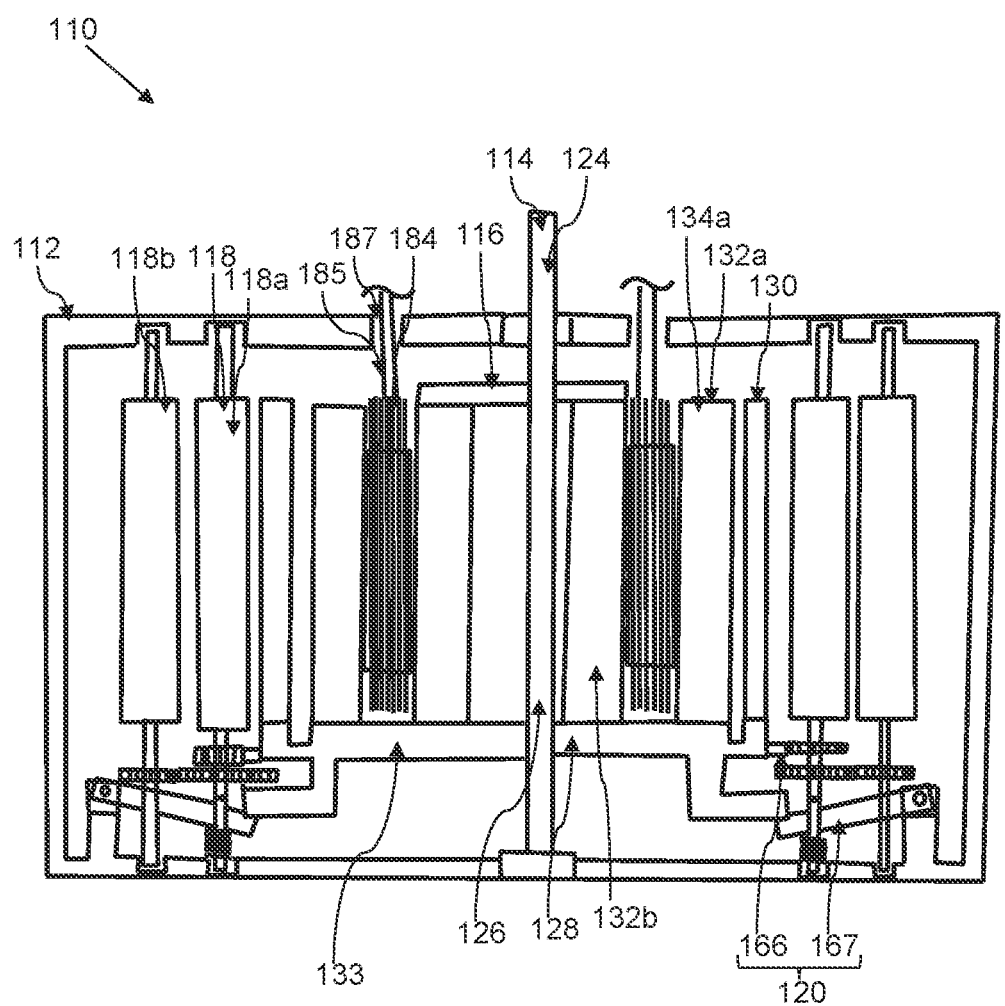
FIG. 8 is an axial cross-sectional representation of a second embodiment of an experimental magnetic motor apparatus, in accordance with the first aspect of the invention.
Figure 9:
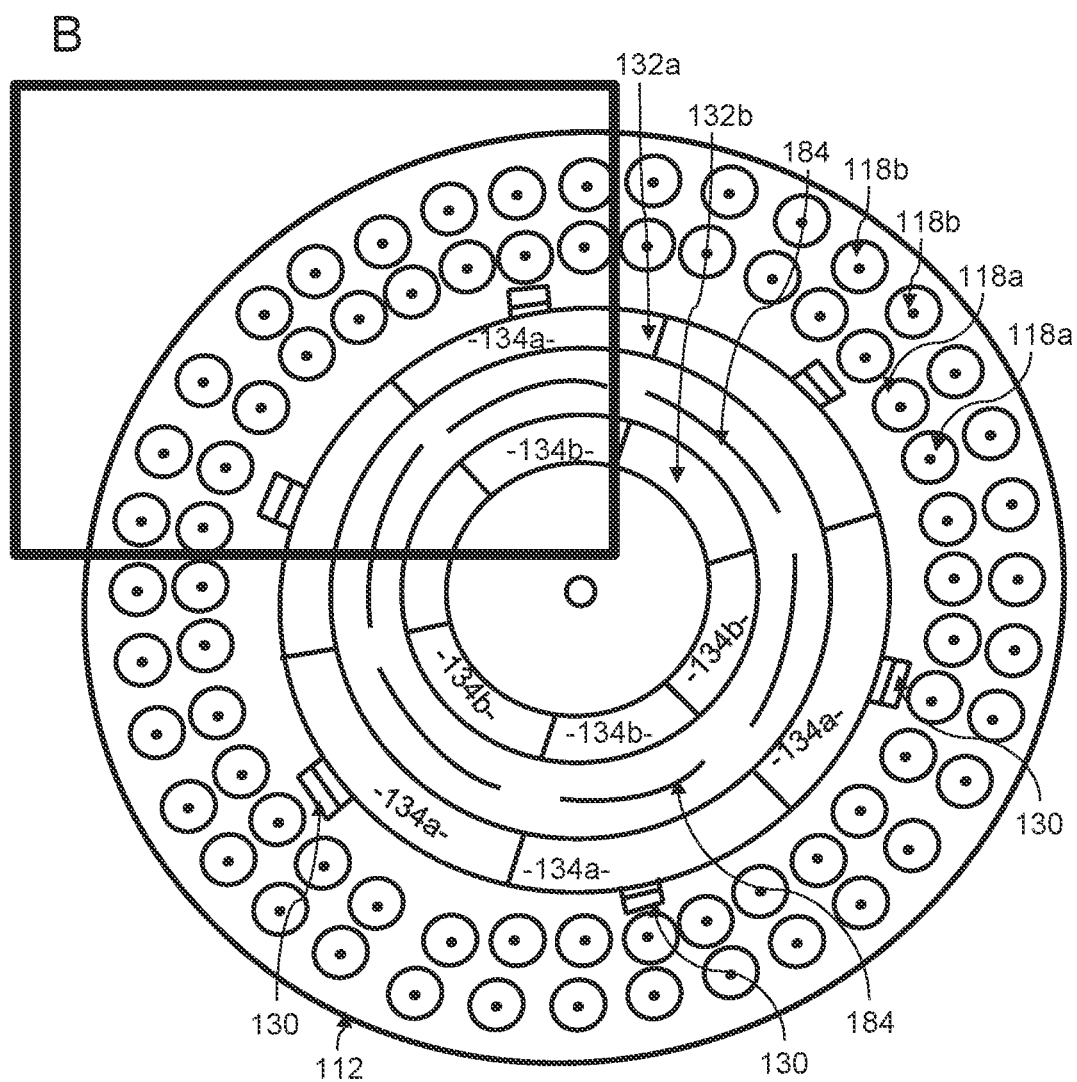
FIG. 9 shows a cutaway plan representation of the motor apparatus of FIG. 8 with the locking mechanism omitted for clarity.

Referring now to FIGS. 8 and 9, there is shown a second embodiment of an experimental magnetic motor apparatus indicated generally at 110.

Features of the second embodiment of the motor apparatus 110 which are similar to features of the first embodiment of the motor apparatus 10 have similar reference numerals with the prefix "1" added.

The motor apparatus 110 of the second embodiment is similar to the motor apparatus 10 of the first embodiment, have similar motor housing 112, output means 114, rotor or rotor element 116, at least one urging element or part 118, a locking mechanism 120, a first rotor element or part 132a having at least one rotor magnet 134a, a rotor-support 128 having at least one platform element or platform 133, at least one shielding element or shield 130, a rotation-imparting element or part 166 including an array of teeth 173, a blocking element or block 167 including at least one second blocking portion 175 and at least one first blocking portion 174, the or each first blocking portion 174 including a movable part 176, a blocking portion support 177 and a biasing means or biasor 178. Detailed description of the common features is omitted for brevity. Any of these features may be omitted and/or a plurality provided, however.

In the second embodiment, the rotor element 16 further comprises a second rotor element or part 132b.

For clarity, features of the second rotor element or part 132b which are the same as or similar to features of the first rotor element or part 132a have similar reference numerals with the suffix "b" added, whilst features of the first rotor element 132a have the suffix "a" added.

The second rotor element 132b is similar to the first rotor element 132a of the second embodiment or to the first rotor element 32 of the first embodiment. Detailed description is omitted for brevity. The second rotor element 132b comprises a plurality of rotor magnets 134b arranged in a circle around the rotor-axis 126 and concentric with the first rotor element 132a.

Figure 10:
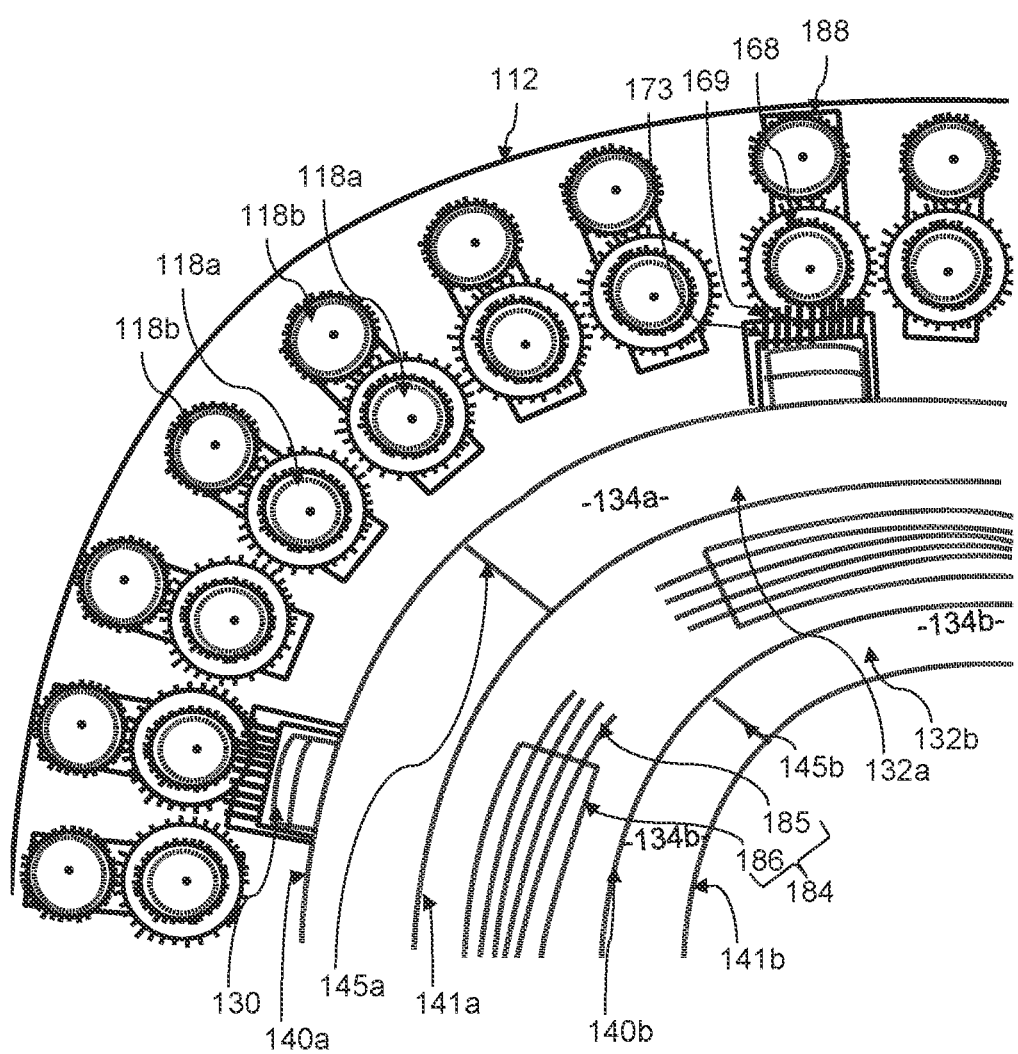
FIG. 10 illustrates a close-up representation of the rectangle B of FIG. 9 in which the locking mechanism is shown, and in which with electromagnets, inner and outer urging magnets, inner and outer rotor elements, and shielding element magnets are represented in dashed lines for clarity.

The second rotor element 132b may be situated radially outwardly or, preferably, inwardly of the first rotor element 132a. This is shown in FIG. 9 and more clearly in FIG. 10. Thus, the second rotor element 132b may be referred to as an inner rotor element 132b and the first rotor element 132a may be referred to as an outer rotor element 132a, or vice versa.

Preferably, the rotor inward-facing surfaces 141a of the outer rotor element 132a align with the rotor outward-facing surface 140b of the inner rotor element 132b. The outer rotor outward-facing surface 140a faces the urging elements 118a. The inner rotor element 132b and the outer rotor element 132a are rotatable around the common central axis of rotation or rotor-axis 126. The inner rotor inward-facing surfaces 141b faces the rotor-axis 126. The inner rotor magnets 134b may be referred to as inner movers and the outer rotor magnets 134a may be referred to as outer movers.

The number of inner movers or inner rotor magnets 134b is preferably the same number as the number of outer movers or outer rotor magnets 134a but different numbers may be an option. At least some, and preferably all outer movers or outer rotor magnets 134a and inner movers or inner rotor magnets 134b are permanent magnets, and even more preferably arc or arcuate permanent magnets. Preferably, the inner rotor magnets 134b and outer rotor magnets 134b are aligned or substantially aligned with each other. The "north" rotor outward-facing surface 140b of inner movers or inner rotor magnets 134b face the "south" rotor inward-facing surface 141a of outer movers or outer rotor magnets 134a. In other words, the movers are orientated in the same way, but the opposite may be envisioned. Furthermore, the first rotor element 132a and the second rotor element 132b preferably turn in unison with each other in-use, but this is optional.

The output means, portion, part or element 114 of the second embodiment may include an output shaft 124. In addition to or instead of an output shaft 124, the output means 114 may comprise at least one electromagnet 184. The at least one electromagnet 184 may extract energy from the motor apparatus 110 and/or may generating a magnetic field to provide an electromagnetic force to drive the rotor element 116.

Preferably, there are as many electromagnets 184 as there are magnets in the first rotor element 132a and/or the second rotor element 132b. In the shown embodiment, there are six electromagnets 184. Each, or at least one electromagnet 184 is arranged radially inwardly of the outer rotor element 132a. Furthermore, each, or at least one electromagnet 184 is arranged radially outwardly of the inner rotor element 132b. In other words, the electromagnets 184 are preferably positioned or positioned between the outer rotor element 132a and the inner rotor element 132b, but radially inwards of the inner rotor element or radially outwardly of the outer rotor element may be an option. Each electromagnet 184 preferably extends along an at least minor and more preferably all or at least along a major portion a length of an outer rotor magnet 134a and/or of an inner rotor magnet 134b. Preferably, each electromagnet 184 does not overlie or overlap a junction 145a, 145b.

The electromagnets 184 are preferably connected or connectable to a stationary component, which is the housing 112 in the shown embodiment. The electromagnets 184 are preferably non-rotatable and/or stationary. Each electromagnet 184 comprises a wire 185 and a core 186. The wire 185 comprises an electrically conductive material, such as a metal. Preferably, the metal is copper but any other metal may be envisioned. The casing or housing 112 may optionally further comprise at least one wire aperture 187 for letting a wire therethrough. There may be as many wire apertures 187 as there are wires 185, but fewer or more may be envisioned.

The core 186 provides a support around which the wire 185 may be wound into a coil. The core 186 may comprise soft iron. Thus, the EM coils are preferably fixed to the casing. They are thus stationary. Furthermore, the EM coils may be located between the inner movers and the outer movers.

As the rotor 116 turns, the magnetic field generates electricity inside the at least one electromagnet 184. The electricity can be stored in a battery by way of example. Due to the consecutive alternating polarities of the rotor elements 132a, 132b, the electricity generated may be Alternating Current AC. It may be desirable to convert AC current into DC current. In this case, a rectifier may need to be provided.

The motor apparatus 110 may comprise a power source, not shown, but this is entirely optional. The power source may be electrical main and/or a battery.

In the second embodiment, the motor apparatus 110 further comprises at least one, and more preferably a plurality of further urging elements 118b. The provision of outer urging elements 118b may in-use increase the strength of the magnetic field, and thereby the urging force imparted to the rotor element 116.

For clarity, features of the further urging elements 118b which are the same as or similar to features of the urging elements 118a have similar reference numerals with the suffix "b" added, whilst features of the urging elements 118a have the suffix "a" added. Furthermore, the urging elements 118a may be referred to as inner urging elements or inner segments 118a and the further urging elements 118b may be referred to as outer urging elements or outer segments 118b.

The outer urging elements 118b are similar to the inner urging elements 118a, having similar, preferably permanent, urging magnet 155a, 155b, poles 161a, 161b, and being rotatable around a peripheral axis 156b. Detailed description of the common features of the outer urging elements 118b which are the same or similar to the features of the inner urging elements 118a is omitted for brevity.

Figure 11:
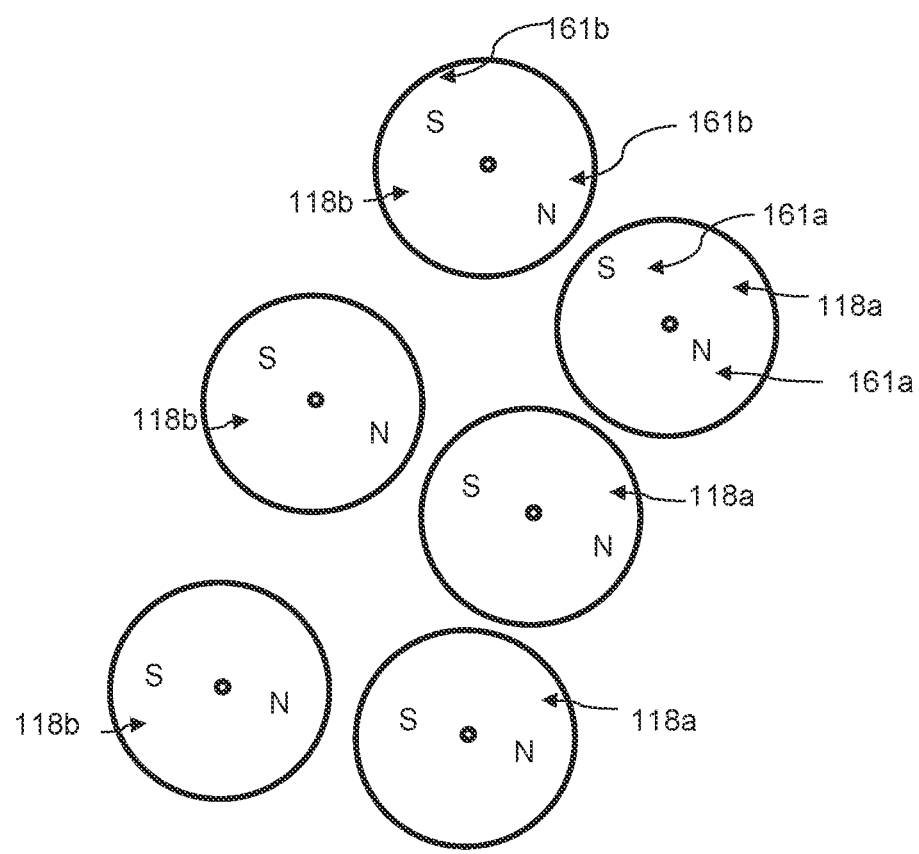
FIG. 11 is a plan representation of the arrangement of magnetic poles of the inner and outer urging elements of the motor apparatus of FIG. 8; and o.

There are preferably as many outer urging elements 118b as there are inner urging elements 118a. Thus, in the preferred embodiment, there are thirty-six outer urging elements 118b, but a smaller or greater number of outer urging elements may be envisioned. Each outer urging element 118b is associated with an inner urging element 118a. Each outer urging element 118b is arranged radially outwardly, at least in part, of an inner urging element 118a. Thus, the outer urging element 118b are arranged to form a shape concentrically around the rotor element 116, the plurality of shielding elements 130 and the plurality of inner urging elements 118a. The shape is preferably a circle. In other words, the outer segments or outer urging element 118b form a ring outside and/or around the inner segments or inner urging elements 118a. Preferably, the inner urging element 118a has a polar surface which faces the polar surface of opposite polarity of the outer urging element 118b such that opposite poles face each other. This is shown in FIG. 11.

Figure 12:
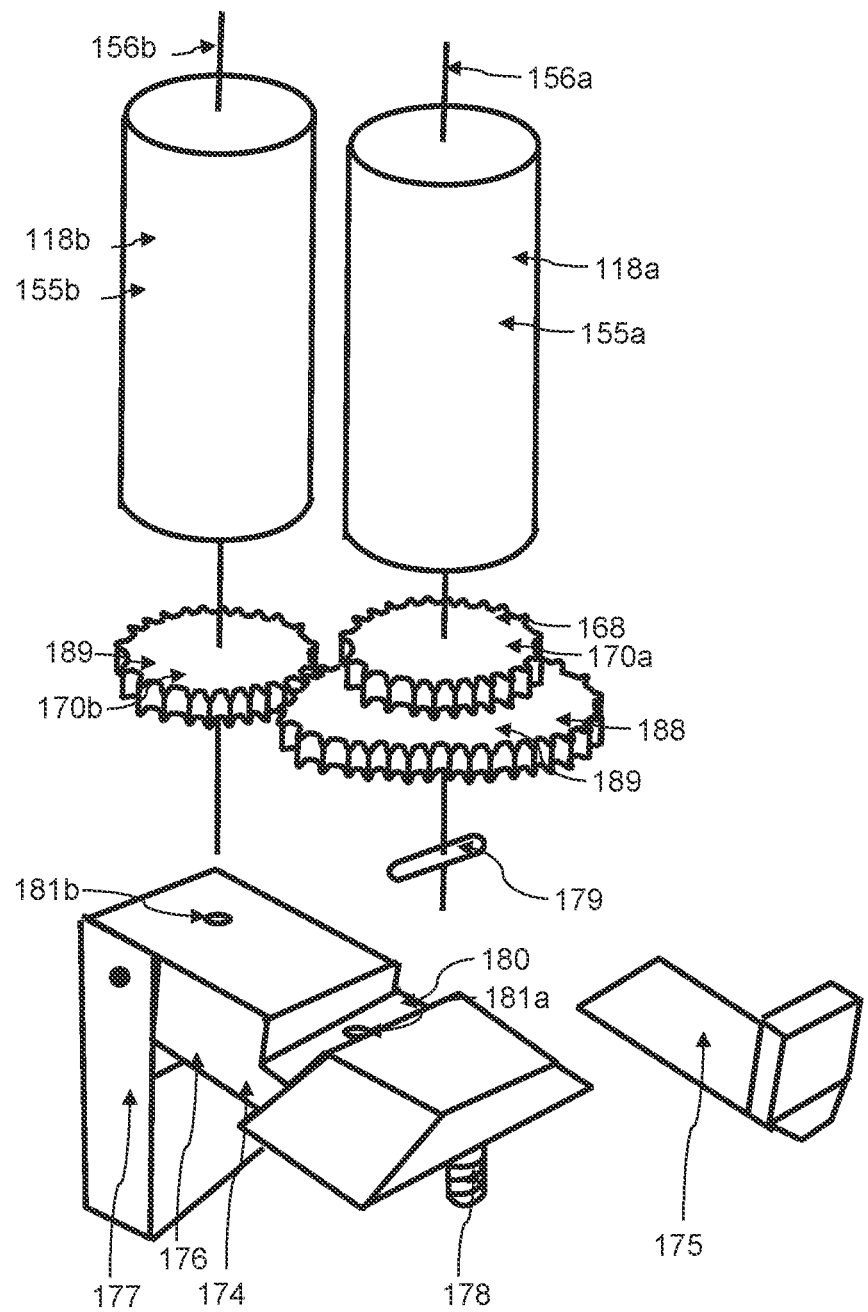
FIG. 12 shows a perspective exploded representation of part of the locking mechanism, an outer urging element and an inner urging element of the motor apparatus of FIG. 8.

The rotation-imparting element 166 of the second embodiment optionally comprises at least one first rotation-imparting portion 168 and at least one second rotation-imparting portion 169, similarly to the first embodiment. Detailed description of the common features is omitted for brevity. The rotation-imparting element 166 further comprises at least one rotation-transmission mechanism 188, best shown in FIG. 12. The or each rotation-transmission mechanism, means, or portion 188 transmits or imparts a force to rotate at least one outer urging element 118b. Each rotation-transmission mechanism 188 comprises at least one linking element 189. The or each linking element 189 is preferably a cog, wheel element or wheel 170b, similar to the wheel 170a of an inner urging element 118a. Preferably, the wheel 170b has peripheral teeth such that it is a cogged wheel 170b but the teeth are optional. The or each linking element 189 may be associated with an inner urging element 118a and/or an outer urging element 118b. The diameter of all the wheels may be the same, or any wheel may have a bigger or smaller diameter relative to at least one other wheel. Similarly, all urging elements preferably have the same dimensions, but this is optional. For instance, an outer urging element may have a greater or a smaller diameter than another outer urging element and/or an inner urging element.

In the shown embodiment, the rotation-transmission mechanism 188 comprises two linking elements 189. One of the linking elements 189 is associated with the outer urging element 118b. The other linking element 189 is associated with the inner urging element 118a. The two linking elements 189 are positioned or positionable in order to interact with each other. Thus, there they are preferably radially and axially positioned relative to each other such that their periphery, which may have teeth as shown, abut and/or interengage with each other. In other words, each outer segment or outer urging element 118b is preferably connected to an inner segment or inner urging element 118a by two toothed wheels 170b, each toothed wheel 170b being attached to a segment axle 156a, 156b so that as the inner segment 118a is being turned, it turns the outer segment 118b and they both flip their polarity.

Each movable part 176 of the first blocking portion 174 is associated or associable with both an inner urging element 118a and an outer urging element 118b as shown. Similarly to the first embodiment, only the inner urging element 118a is associated with an anti-rotation element 179 engageable with the stop element 180. The first blocking portion 174, and more preferably, the movable part 176 thereof further comprises a slot, groove, or through-bore 181*b* for receiving and/or supporting the peripheral axis of rotation 156*b* of the outer urging element 118*b*, similar to the through-bore 181*a* for receiving the peripheral axis of rotation 156*a*, of the inner urging element 118*a* but this is optional.

The additional features of the second embodiment may make the motor apparatus 110 more powerful, more useful and/or more controllable. Thus, the second embodiment of the motor apparatus 110 may comprise any of and preferably all of: the electromagnetic (EM) coils, outer segments or outer urging element 118*b*, a second rotor element 132*b* comprising rotor magnets or inner movers 134*b*.

The uses of the motor apparatus 110 of the second embodiment are similar to those of the motor apparatus 10 of the first embodiment. Detailed description of the common assembly steps, disassembly steps, and use are omitted for brevity. The differences are as follows.

If provided, the electromagnets 184 are connected to the housing 112. The electromagnets 184 may be arranged to optionally form a circle or polygon or sections thereof. The peripheral axis of rotation 156*b* of each outer urging element 118*b* is received in its through-bore 181*b*, if provided. Each outer urging element 118*b* is connected to the housing 112. Preferably, the urging first surface 162*b* of the outer urging element 118*b* faces the oppositely polarised urging second surface 163*a* of the inner urging element 118*a*, or vice-versa. However, the urging surfaces of same polarity may face each other instead. These steps may be done at any point of assembly of the motor apparatus 10. The output shaft 124 may or may not be included in the motor apparatus 10.

Once assembled, the first circle is formed by the inner rotor element 132*b*. The second circle, corresponding to the outer rotor element 132*a*, is concentrically disposed around the inner rotor element 132*b*. The shielding elements 130 are arranged in a third circle concentrically around the outer rotor element 132*a*. The inner rotatable urging elements 118*a* are arranged in a fourth circle concentrically around the rotor element 116 and the plurality of shielding elements 130. The rotatable outer urging elements 118*b* are arranged in a fifth circle concentrically around the rotor element 116, the plurality of shielding elements 130 and the inner rotatable urging elements 118*a*. The second, third and fourth circles of the second embodiment correspond to the first, second and third circles of the first embodiment respectively.

The rotor element 116 of the second embodiment may be put in motion by one of a plurality of ways. If an output shaft 124 is provided, the output shaft 124 may be used to put the rotor element 116 in motion, for example manually and/or via a secondary motor, not shown. If at least one electromagnet 184 is provided, the electromagnet 184 may be electrically energised so as to generate a magnetic field. The magnetic field may in turn impart a magnetic force on the rotor element 116 sufficient to induce rotation thereof.

When the inner urging element 118*a* is prevented from rotating by the blocking element 167, the outer urging element 118*b* is in an equilibrium state where does not rotate either. This may be because there is no force to disturb the outer urging element 118*b* away from its equilibrium state, such as a magnetic force, imparted by the inner urging element 118*a*. In the shown embodiment, the rotation-transmission mechanism 188, and more preferably the interengaged linking elements 189 prevent or inhibit any rotation of the outer urging element 118*b*.

Upon the inner urging element 118*a* being rotated, the outer urging element 118*b* rotates simultaneously or substantially simultaneously. In the shown embodiment, the outer urging element 118*b* is made to rotate due to the rotation-transmission mechanism 188. The intergaged linking elements 189 cause the inner urging element 118*a* and the outer urging element 118*b* to rotate in opposite directions. Preferably, the outer urging element 118*b* also rotates by 180° so that its other urging surface faces the other urging surface of the inner urging element 118*a*. However, the angle of rotation may be altered, for example, by providing linking elements or cogs 189 having a different gear ratio or different dimensions.

The output of the motor apparatus 110 may be mechanical and/or electrical. For example, the mechanical output may be provided via the output shaft 124. An electrical output may be provided via the at least one electromagnet as a magnetic field acting upon a wire can induce an electrical current therein.

Whilst in all the above embodiment, the housing and/or the permanent magnet of at least one said rotatable urging element is preferably cylindrical, non-cylindrical may be an option. Similarly, although the shielding elements and the rotor magnets are preferably arcuate magnets, any shielding element and/or any rotor magnet may be non-arcuate. For instance, any of the magnets may be a straight or cuboid magnet or prism. Furthermore, all the magnets in the above embodiments form a shape that is preferably a circle. However, the shape formed by the plurality of magnets may be non-circular. For example, the shape may be a polygon. One or more magnets may extend at least partly along one or more edges of a polygon. For example, four magnets may face each other pairwise. The magnets may optionally be, rather than arcuate magnets. The four magnets may define a square or rectangle and/or each magnet may extend at least partly along an edge thereof.

Whilst a preferred shape may have been specified for any of the above features, any alternative lateral and/or longitudinal cross-sectional shape of the housing, any magnet, the shape formed by magnets, or any other described feature may be envisioned, such as circular, non-circular, curved, part curved, non-curved, linear, non-linear, oval, ovoid, elliptical, polygonal, including triangular, square, rectangular, pentagonal, hexagonal, octagonal, whether rounded or chamfered, or any abstract shape.

The rotation-transmission mechanism preferably comprises two linking elements or parts. It may easily be envisioned that the linking element associated with the inner urging element may be omitted. In this alternative embodiment, the linking element associated with the outer urging element may engage with the first rotation-imparting portion of the inner urging element directly. Furthermore, the or each linking element is preferably a cog, wheel element or wheel. In a further modification, any alternative may be envisioned. For example, a transmission belt, any gear and/or cog assembly may be envisioned. Furthermore, the at least one rotation-transmission mechanism may be omitted entirely. For example, the polarity change following rotation of an associated inner urging element may be sufficient to cause a rotation in the outer urging element magnetically.

Rather than both an inner urging element or part and an outer urging element or part being associable or associated with a common movable part, each of the inner urging element and the outer urging element may be associated with a separate movable part and/or first blocking portion in an alternative embodiment. In a further modification, only one of the inner urging element and the outer urging element may be associated or associable with a movable part and/or first blocking portion.

It could easily be envisioned that a stop element, part, or stop and/or an anti-rotation element or part may be associated with the outer urging element instead of or in addition to the inner urging element.

Although the second embodiment is described as comprising at least one electromagnet, at least one outer urging element, at least one second rotor element, and at least one rotation-transmission mechanism in addition to the features of the first embodiment, any of these features may be omitted from the second embodiment. Additionally or alternatively, it may be envisioned that any or all of these features may be provided in any of the embodiments, including the first embodiment.

Whilst the locking device or blocking element is preferably mechanical in all the above embodiment, alternative options may be envisioned. For example, the blocking element may be electronic, electrical or electro-mechanical instead. An electromechanical locking device may comprise a motor, and more preferably a DC motor. The motor may be attached or attachable to the casing. The blocking element may comprise a worm screw. The worm screw may be attached to the output shaft and/or the casing. The worm screw may engage the rotor and/or the first rotation-imparting portion or portions, which are here the toothed wheel attached or at least associated with the segment's axle. The worm screw may selectively or permanently prevent the segment from turning when engaged therewith. This may ensure ensuring that the segment's polar surface faces the rotor element.

The first rotation-imparting portion or turning device, which is a wheel in the above embodiments, may alternatively be mechanical, electro-mechanical or magnetic in alternative embodiments. An example of an electro-mechanical turning device may be the same or a further, optionally DC, motor as described in the above alternate locking device embodiment. The motor may turn the segment by 180°, flipping its polarity. In other words, the same motor may both cause rotation of an urging element during a select period and prevent or inhibit rotation of the same urging element outside of the period. The motor may further require an intermediate portion to transmit force to the urging element. An example of a magnetic turning device may comprise a permanent magnet that turns the segment 180°, flipping its polarity.

The triggers, turners and negators may be collectively referred to as the assembly. Whilst the trigger is preferably mechanical in the above embodiment, it may easily be envisioned that the trigger may be non-mechanical. For example, the trigger may be optoelectronic. An example of an optoelectronic trigger may comprise an LED and a photo-transistor. The LED may be associated with the rotor and/or the assembly. The photo-transistor may be associated with the segment, over vice-versa. When the photo-transistor detects the light of the LED, the photo-transistor may activate, the, preferably DC, motor described above, such as by permitting the flow of electrical current to the motor. The motor may then cause the segment to rotate.

In the preferred embodiments described above, the number of rotor magnets and therefore polarity changes is an even number. A reduced or increased number of polarity changes may be reduced or increased by reducing or increasing the number of rotor magnets, respectively. If the number of polarity changes is two, then the first rotor element will have two rotor magnets or movers, one of which has a "north" rotor outward-facing surface and the other a "south" rotor outward-facing surface. If the number of polarity changes, and therefore movers is four, then the rotor element will have two "north" rotor outward-facing surfaces and two "south" rotor outward-facing surfaces alternating in polarity. If the number of rotor magnets or movers is six, there are six polarity changes.

Any of the above embodiments of the motor apparatus may further comprise any of: lubrication, control electronics, and a small rechargeable battery but either feature may be omitted. The control electronics may control the magnitude and direction of the output, regulate the speed and direction of motor apparatus, generate electricity and store it in a battery, and/or boost output of motor apparatus from a battery.

Whilst the shielding elements are preferably not movable relative to the first and/or second rotor element, this alternative may be envisioned. In other words, the assembly preferably rotates or turns in unison with the movers or rotor magnets, but it could easily be envisioned that rotor magnets may be movable relative to the shielding elements and/or any part of the assembly. To this effect, the rotor-support may comprise a third platform element associated with the shielding elements at least. The third platform element may further comprise or provide a support for at least one second rotation-imparting portion, and/or at least one second blocking portion. The third platform element may be selectively movable relative to the other platform element or elements. Preferably in-use, the third platform may rotate with the rotor element or elements. Thus, a connection or engagement mechanism may be provided to enable the user to select when the third platform is movable relative to the rotor element and when the whole rotor moves together as one.

The assembly and/or the shielding elements may have a magnetic axis. Similarly, a mover may have a magnetic axis. Preferably, the magnetic axes may be colinear or parallel and/or non-movable relative to each other. However, the shielding element and/or assembly magnetic axis may be movable to turn relative to the mover's magnetic axis, forming an angle therebetween. The angle may be changeable, either manually and/or by a, preferably DC, motor. Changing the angle may be achieved via changing the position of the third platform element relative to the other platform element or elements. The, preferably DC, motor may optionally be connectable, connected, or fixed to the rotor. A worm screw may be attached to the motor's output shaft. The worm screw may engage with a toothed wheel attached to an urging element and/or assembly.

The rotation velocity of the rotor, and therefore the magnitude of the output may be altered by changing the angle between the assembly and/or shielding elements and a mover, either manually or by the, preferably DC, motor. The mechanical output can also be temporarily increased or reduced by activating the electromagnets by passing an electrical current through them. This may be done via the control electronics and the battery. The direction of the rotation of the rotor can be reversed by reducing the output until the motor apparatus reaches a "stop" condition stops. The user may change the angle between the magnetic axes further until the rotor turns in the opposite direction. A small battery that supplies the electricity may be kept charged by the electricity generated in the electromagnets.

It is therefore possible to provide an experimental magnetic motor apparatus which has permanent magnets arranged in concentric circles around each other and rotatable around a central axis of rotation, surrounded by a further circle of permanent magnets each selectively rotatable around a peripheral axis of rotation. The arrangement of magnets enables the motor apparatus to function with the urging elements maintaining at least in part the angular momentum of the rotor element.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. The embodiments described above are provided by way of examples only, and various other modifications will be apparent to persons skilled in the field without departing from the scope of the invention as defined herein.

The invention claimed is:

1. A magnetic motor apparatus comprising:
a motor housing;
a rotor within the motor housing, wherein the rotor is configured to receive an initial force that causes the rotor to rotate from a force external to the motor apparatus and wherein the rotor will stop rotating after a time period without subsequent forces external to the motor apparatus, the rotor having
an inner rotor part including a plurality of permanent arc magnets arranged in a first circle,
an outer rotor part including a plurality of permanent arc magnets arranged in a second circle concentrically disposed around the inner rotor part, the inner rotor part and the outer rotor part being rotatable around a common central axis of rotation, and
a plurality of shields arranged in a third circle concentrically around the outer rotor part;
an output shaft extending along or substantially along the central axis of rotation and at least partly out of the housing, the output shaft being rotatable with the rotor, wherein the output shaft is configured to rotate to which rotation can produce a mechanical or electrical output for a period of time;
a plurality of rotatable urging portion arranged in a fourth circle concentrically around the rotor and the plurality of shields, each rotatable urging portion including a permanent magnet having poles, and being rotatable around a peripheral axis of rotation such that, upon rotation of each rotatable urging portion, each said pole of the rotatable urging portion in-use alternatingly faces the rotor to impart an urging force thereon; and
a locking mechanism arranged to control the rotation of the plurality of rotatable urging portions.

2. The magnetic motor apparatus as claimed in claim 1, wherein the permanent magnet of at least one said rotatable urging portion is cylindrical or a prism.

3. The magnetic motor apparatus as claimed in claim 1, wherein the locking mechanism comprises a rotation-imparting part arranged to impart a rotational force to a rotatable urging portion, and a blocking part arranged to selectively prevent or inhibit rotation of a rotatable urging portion.

4. The magnetic motor apparatus as claimed in claim 3, wherein the rotation-imparting part includes a wheel associated with each rotatable urging portion.

5. The magnetic motor apparatus as claimed in claim 4, wherein the wheel has peripheral teeth.

6. The magnetic motor apparatus as claimed in claim 4, wherein the rotation-imparting part further comprises an array of teeth associated with the rotor and arranged to be temporarily engageable with the wheel to rotate the associated rotatable urging portion.

7. The magnetic motor apparatus as claimed in claim 3, wherein the blocking part includes a movable part arranged to be movable between an engaged condition with a said rotatable urging portion in which rotation of the urging portion is prevented or inhibited, and a disengaged condition in which rotation of the urging portion is permitted.

8. The magnetic motor apparatus as claimed in claim 7, wherein the movable part comprises a pivotable arm.

9. The magnetic motor apparatus as claimed in claim 7, wherein the movable part has a lateral cross-sectional shape which is one of: a trapezium, a trapezoid, and a triangle.

10. The magnetic motor apparatus as claimed in claim 7, wherein the blocking part further comprises a biasor arranged to maintain the movable part in the engaged condition or bias the movable part into or towards the engaged condition if the movable part is in the disengaged condition.

11. The magnetic motor apparatus as claimed in claim 10, wherein the biasor comprises a spring.

12. The magnetic motor apparatus as claimed in claim 7, wherein the blocking part includes a disengagement part arranged to move the movable part from the engaged condition to the disengaged condition.

13. The magnetic motor apparatus as claimed in claim 12, wherein the disengagement part includes a fixed cantilevered arm extending from the rotor and arranged to be temporarily engageable with the movable part to exert a force thereagainst.

14. The magnetic motor apparatus as claimed in claim 12, wherein the disengagement element has a lateral cross-sectional shape which is one of: a trapezium, a trapezoid, and a triangle.

15. The magnetic motor apparatus as claimed in claim 3, wherein the blocking part further includes an anti-rotation part and a stop part engageable with the anti-rotation part to prevent or inhibit rotation of an urging element.

16. The magnetic motor apparatus as claimed in claim 15, wherein the stop part includes a groove and/or the anti-rotation part comprises an elongate portion receivable within the groove.

17. The magnetic motor apparatus as claimed in claim 1, further comprising an electromagnet arranged to generate a magnetic field to provide an electromagnetic force to drive the rotor element or arranged to extract energy from the motor apparatus.

18. The magnetic motor apparatus as claimed in claim 17, wherein the electromagnet is arranged radially outwardly of the inner rotor part and/or inwardly of the outer rotor part.

19. The magnetic motor apparatus as claimed in claim 1, further comprising a plurality of rotatable outer urging portions arranged in a fifth circle concentrically around the rotor, the plurality of shields and the plurality of rotatable urging portions arranged in a fourth circle, each rotatable outer urging portion including a permanent magnet having poles, and being rotatable around a peripheral axis.

* * * * *